(12) United States Patent
Kwon et al.

(10) Patent No.: US 10,520,983 B2
(45) Date of Patent: Dec. 31, 2019

(54) ELECTRONIC DEVICE AND CONTROL METHOD THEREOF

(71) Applicant: Lenovo (Beijing) Co., Ltd., Beijing (CN)

(72) Inventors: Jincherl Kwon, Beijing (CN); Ge Gao, Beijing (CN); Yan Gao, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/854,941

(22) Filed: Sep. 15, 2015

(65) Prior Publication Data

US 2017/0003714 A1    Jan. 5, 2017

(30) Foreign Application Priority Data

Jun. 30, 2015    (CN) .......................... 2015 1 0379441

(51) Int. Cl.
*G06F 1/16*    (2006.01)
*G09G 5/00*    (2006.01)

(52) U.S. Cl.
CPC .......... *G06F 1/1641* (2013.01); *G06F 1/1652* (2013.01); *G09G 5/003* (2013.01); *G09G 2320/08* (2013.01); *G09G 2380/02* (2013.01)

(58) Field of Classification Search
CPC ..... G06F 1/1641; G06F 1/1652; G09G 5/003; G09G 2320/08; G09G 2360/145; G09G 2380/02
USPC ....................................................... 345/156
See application file for complete search history.

(56) References Cited

U.S. PATENT DOCUMENTS

| | | | | |
|---|---|---|---|---|
| 6,223,393 B1* | 5/2001 | Knopf | .................... | G06F 1/1618 16/366 |
| 7,082,196 B2* | 7/2006 | Kauhaniemi | ....... | H04M 1/0214 379/433.13 |
| 7,532,916 B2* | 5/2009 | Lee | ..................... | H04M 1/0216 379/433.13 |
| 8,654,095 B1* | 2/2014 | Cho | ...................... | G06F 3/0412 345/173 |
| 8,713,759 B2* | 5/2014 | Cai | ....................... | G06F 1/1681 16/366 |

(Continued)

OTHER PUBLICATIONS

Office Action dated Feb. 26, 2016 out of corresponding German application No. 102015116589.9 (22 pages including English translation).

*Primary Examiner* — Benyam Ketema
(74) *Attorney, Agent, or Firm* — Brinks Gilson & Lione; John C. Freeman

(57) ABSTRACT

An electronic device includes a first body having a first end and a second end; a connecting body having a third end and a fourth end, the third end being connected to the second end. The device also includes a second body having a fifth end and a sixth end, with the second body being at least capable of moving relative to the first body. The electronic device has at least a first rotation manner and a second rotation manner. In the first rotation manner, the electronic device is capable of implementing a relative rotation between a first part and a second part; and in the second rotation manner, the electronic device is capable of implementing a relative rotation between a third part and a fourth part. The electronic device may switch between two modes by sliding, and thus improve the user's experience.

14 Claims, 27 Drawing Sheets

(56) References Cited

U.S. PATENT DOCUMENTS

| | | | | |
|---|---|---|---|---|
| 2002/0067339 A1* | 6/2002 | Min | G06F 1/1601 | 345/156 |
| 2006/0038745 A1* | 2/2006 | Naksen | G06F 1/1624 | 345/30 |
| 2006/0050169 A1* | 3/2006 | Misawa | G06F 1/1616 | 348/333.06 |
| 2007/0097014 A1* | 5/2007 | Solomon | G06F 1/1616 | 345/1.1 |
| 2008/0167095 A1* | 7/2008 | Kim | H04M 1/0216 | 455/575.3 |
| 2008/0291225 A1* | 11/2008 | Arneson | G06F 3/011 | 345/698 |
| 2010/0232100 A1* | 9/2010 | Fukuma | F16G 13/18 | 361/679.01 |
| 2011/0241998 A1* | 10/2011 | McKinney | G06F 1/1616 | 345/168 |
| 2012/0262367 A1* | 10/2012 | Chiu | G06F 1/1626 | 345/156 |
| 2013/0201093 A1* | 8/2013 | Kim | G06F 3/033 | 345/156 |
| 2014/0179380 A1* | 6/2014 | Roh | H04M 1/0268 | 455/569.1 |
| 2014/0213324 A1* | 7/2014 | Tan | H04M 1/0268 | 455/566 |
| 2014/0226275 A1* | 8/2014 | Ko | G06F 1/1626 | 361/679.27 |
| 2014/0285476 A1* | 9/2014 | Cho | G06F 1/1601 | 345/204 |
| 2015/0009128 A1* | 1/2015 | Matsumoto | G06F 3/03 | 345/156 |
| 2015/0227224 A1* | 8/2015 | Park | G06F 3/0487 | 345/173 |
| 2015/0370287 A1* | 12/2015 | Ko | G06F 1/1626 | 361/749 |
| 2015/0378557 A1* | 12/2015 | Jeong | G06F 3/0488 | 715/835 |
| 2017/0090681 A1* | 3/2017 | Gao | G06F 1/1652 | |

* cited by examiner

ELECTRONIC DEVICE AND CONTROL METHOD THEREOF

This application claims priority to Chinese patent application No. 201510379441.1 filed on Jun. 30, 2015, the entire contents of which are incorporated herein by reference.

The present disclosure relates to the field of electronic devices, and more particularly, to an electronic device and a mode switching method thereof.

BACKGROUND

Generally, there may be various types of devices such as cellphones, including bar-type ones with number and function keys set on the outside surface, ones with clamshells and folding-type ones that are foldable. As screen sizes of cellphones are continuously increasing, demands for folding-type handheld devices also increase a lot in consideration of convenience.

Currently, in existing solutions, folding modes of the folding-type handheld devices with flexible screens may be switched by folding the devices. However, such a turning operation is inconvenient for a user to perform. When the device is in a folded state, the screen thereof is completely covered, and thus the user is not able to view messages in time.

SUMMARY

In order to solve the above problems, according to one aspect of the present disclosure, there is provided an electronic device, comprising: a first body having a first end and a second end, the first end being a free end; a connecting body having a third end and a fourth end, the third end being connected to the second end; a second body having a fifth end and a sixth end, the fifth end being connected to the fourth end, the six end being a free end, the second body being capable of moving relative to the first body by means of the connecting body; wherein the electronic device has at least a first rotation manner and a second rotation manner: in the first rotation manner, the electronic device is capable of implementing a relative rotation between a first part and a second part with a rotation axis being at a first position of the connecting body, wherein the first part comprises the first body and a first connecting sub-body; the second part comprises the second body and a second connecting sub-body; the first connecting sub-body and the second connecting sub-body are formed by dividing the connecting body at the first position; and in the second rotation manner, the electronic device is capable of implementing a relative rotation between a third part and a fourth part with a rotation axis being at a second position of the connecting body, wherein the third part comprises the first body and a third connecting sub-body; the fourth part comprises the second body and a fourth connecting sub-body; the third connecting sub-body and the fourth connecting sub-body are formed by dividing the connecting body at the second position.

According to another embodiment of the present disclosure, there is provided a mode switching method applied to an electronic device, the mode switching method comprising: detecting a mode of the electronic device; and controlling a mode switching of the electronic device according to a detected mode; wherein the electronic device comprises: a first body having a first end and a second end; a connecting body having a third end and a fourth end, the third end being connected to the second end; a second body having a fifth end and a sixth end, the fifth end being connected to the fourth end, the second body being capable of moving relative to the first body by means of the connecting body; the electronic device has at least a first rotation manner and a second rotation manner: in the first rotation manner, the electronic device is capable of implementing a relative rotation between a first part and a second part with a rotation axis being at a first position of the connecting body, the first part comprises the first body and a first connecting sub-body; the second part comprises the second body and a second connecting sub-body; the first connecting sub-body and the second connecting sub-body are formed by dividing the connecting body at the first position; and in the second rotation manner, the electronic device is capable of implementing a relative rotation between a third part and a fourth part with a rotation axis being at a second position of the connecting body, wherein the third part comprises the first body and a third connecting sub-body; the fourth part comprises the second body and a fourth connecting sub-body; the third connecting sub-body and the fourth connecting sub-body are formed by dividing the connecting body at the second position.

BRIEF DESCRIPTION OF THE DRAWINGS

Through the more detailed description of embodiments of the present disclosure with reference to the accompanying drawings, the above and other objectives, features, and advantages of the present disclosure will become more apparent. The drawings are to provide further understanding for the embodiments of the present disclosure and constitute a portion of the specification, and are intended to interpret the present disclosure together with the embodiments rather than to limit the present disclosure. In the drawings, the same reference sign generally refers to the same component or step.

DETAILED DESCRIPTION

To make the objectives, technical solutions, and advantages of the present disclosure more clear, exemplary embodiments of the present disclosure will be described in detail with reference to the accompanying drawings. Obviously, the described embodiments merely are only part of the embodiments of the present disclosure, rather than all of the embodiments of the present disclosure, it should be understood that the present disclosure is not limited to the exemplary embodiments described herein. All other embodiments obtained by those skilled in the art without paying inventive efforts should all fall into the protection scope of the present disclosure.

Hereinafter, the embodiments of the present disclosure will be described in detail with reference to the accompanying drawings.

Figure 1A:
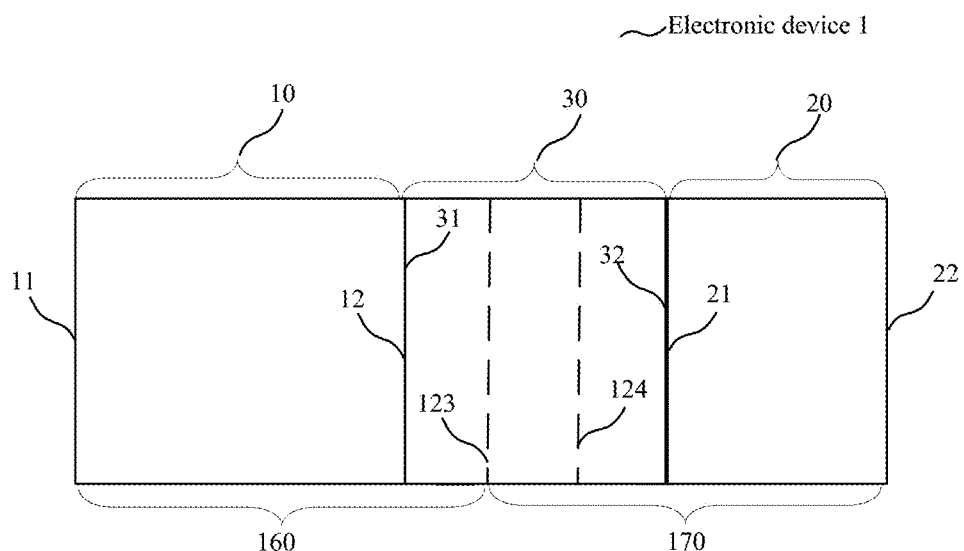
FIGS. 1A and 1B are schematic diagrams illustrating an electronic device according to an embodiment the present disclosure.

FIG. 1A shows a schematic structural diagram illustrating an electronic device 1 according to an embodiment the present disclosure. Generally, the electronic device 1 according to an embodiment of the present disclosure may be such an electronic device like tablet computer, smart phone, personal digital assistant, smart wearable device. In the following, for convenience of description, the smart phone will be described as an example of the electronic device.

As shown in FIG. 1A, the electronic device 1 according to an embodiment of the present disclosure may comprise a first body 10, a second body 20, and a connecting body 30. Specifically, as shown in FIG. 1A, the first body 10 may have a first end 11 and a second end 12, wherein the first end 11 may be a free end, and the second end 12 may be connected to a third end 31 of the connecting body 30. The connecting body 30 may have a third end 31 and a fourth end 32, wherein the third end 31 of the connecting body 30 may be connected to the second end 12 of the first body 10, and the fourth end 32 of the connecting body 30 may be connected to a fifth end 131 of the second body 20, the connecting body 30 may rotate relative to the first body 10. The second body 20 may have a fifth end 131 and a sixth end 132, wherein the fifth end 131 may be connected to the fourth end 32 of the connecting body 30, and the sixth end 132 of the second body 20 may be a free end, the second body 20 is capable of moving relative to the first body 10 by means of the connecting body 30. Additionally, it should be noted that the term "end" used herein refers to a part in a certain range of respective end surfaces of the first body 10, the second body 20, and the connecting body 30. For example, the first end 11 of the first body may be at least a side surface part of the electronic device 1 around the first end 11 of the first body.

Figure 1B:
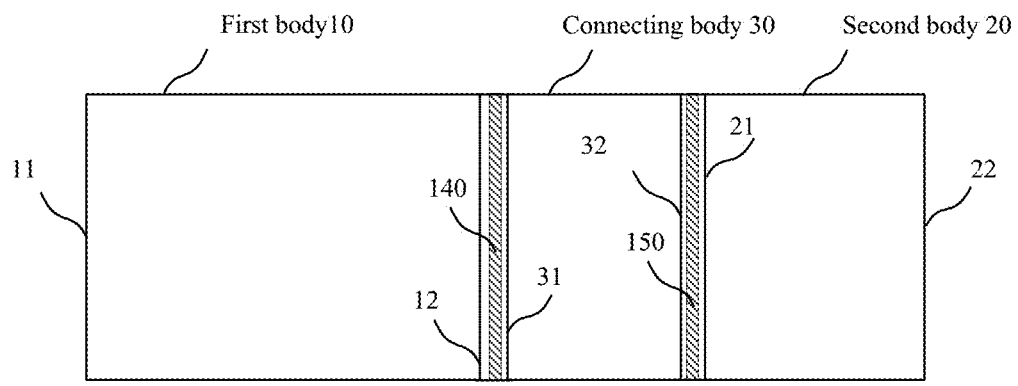

Specifically, FIG. 1B shows a schematic structural block diagram of the electronic device 1 according to an example of the present disclosure. As shown in FIG. 1B, the second end 12 of the first body 10 may be connected to the third end 31 of the connecting body 30 through a first connecting member 140, the first connecting member 140 can enable the first body 10 and the second body 20 to rotate relative to each other, thereby a first surface of the first body 10 and a first surface of the second body 20 may be close to or away from each other relatively. And the connecting body 30 and the second body 20 may be connected through a second connecting member 150, the relative rotation of the connecting body 30 and the second body 20 can make the first surface of the connecting body 30 and the first surface of the second body 20 be close to or away from each other relatively. In this example, when the electronic device has a display screen, the first surface of the first body 10, the first surface of the connecting body 30, and the first surface of the second body 20 may be a surface on which the electronic device 1 has the display screen.

In other embodiments of the present disclosure, the connecting body 30 may be composed by a plurality of rotary members and a non-rotary member therein between, wherein rotary members that implement a connection between the connecting body 30 and the first body 10 and a connection between the connecting body 30 and the second body 20 may be uniformly considered to a compose member of the connecting body 30. In other words, in other embodiments of the present disclosure, the body other than the first body 10 and the second body 20 in the electronic device 1 may be all considered as the connecting body 30.

The electronic device 1 as shown in FIG. 1A may have at least a first rotation manner and a second rotation manner. Specifically, in the first rotation manner, the electronic device 1 is capable of implementing a relative rotation between a first part and a second part of the electronic device 1 with a rotation axis being at a first position of the connecting body 30. The first part comprises the first body 10 and a first connecting sub-body; the second part comprises the second body 20 and a second connecting sub-body; the first connecting sub-body and the second connecting sub-body are formed by dividing the connecting body 30 at the first position. In the second rotation manner, the electronic device 1 is capable of implementing a relative rotation between a third part and a fourth part with a rotation axis being at a second position of the connecting body 30. The third part comprises the first body 10 and a third connecting sub-body; the fourth part comprises the second body 20 and a fourth connecting sub-body; the third connecting sub-body and the fourth connecting sub-body are formed by dividing the connecting body 30 at the second position.

For example, in one embodiment of the disclosure, as shown in FIG. 1A, the first position may be a position on the connecting body 30 where a dotted line 123 is drawn. In this case, the first position divides the connecting body 30 into the first connecting sub-body and the second connecting sub-body. The connecting sub-body next to the first body 10 is the first connecting sub-body, and the connecting sub-body next to the second body 20 is the second connecting sub-body. The first body 10 and the first connecting sub-body constitute the first part 160, and the second body 20 and the second connecting sub-body constitute the second part 170. In the present embodiment, the second position may be a position on the connecting body 30 where a dotted line 124 is drawn. In this case, the second position divides the connecting body 30 into the third connecting sub-body and the fourth connecting sub-body. The connecting sub-body next to the first body 10 is the third connecting sub-body, and the connecting sub-body next to the second body 20 is the fourth connecting sub-body. The first body 10 and the third connecting sub-body constitute the third part, and the second body 20 and the fourth connecting sub-body constitute the fourth part. In general, the first position is closer to the first body 10 than the second position. In the first rotation manner of the electronic device, the electronic device 1 may use the line where the first position resides as its rotation axis, so as to make the first part and the second part rotate relative to each other, such that the second part can partially cover a first surface of the first part. In the second rotation manner of the electronic device, the electronic device 1 may use the line where the second position resides as its rotation axis, so as to make the third part and the fourth part rotate relative to each other, such that the fourth part can partially cover a first surface of the third part.

In one embodiment of the disclosure, the electronic device may also have a first mode and a second mode. In the first mode, the electronic device 1 rotates in the first rotation manner, and a maximum distance between corresponding points of the first body 10 and the second body 20 is less than a first threshold. In the second mode, the electronic device 1 rotates in the second rotation manner, and a maximum distance between corresponding points of the first body 10 and the second body 20 is less than a first threshold. The exposed region on the first surface of the first body of the electronic device in the first mode is smaller than that in the second mode.

Figure 2A:
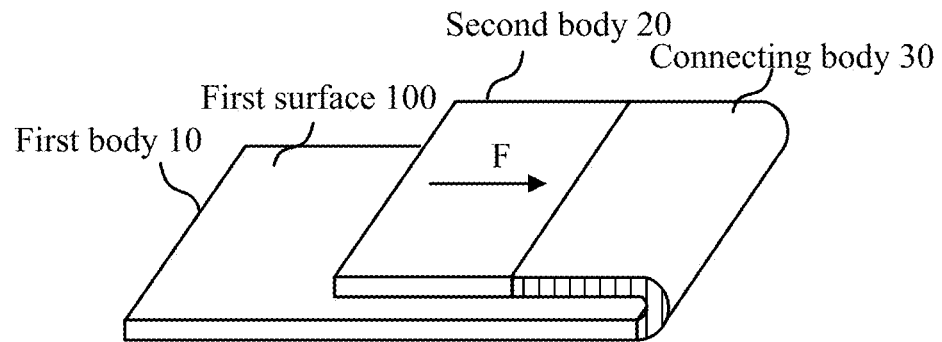
FIGS. 2A to 2C are schematic diagrams illustrating a switching process between a first mode and a second mode of the electronic device according to a first embodiment of the present disclosure.
Figure 2B:
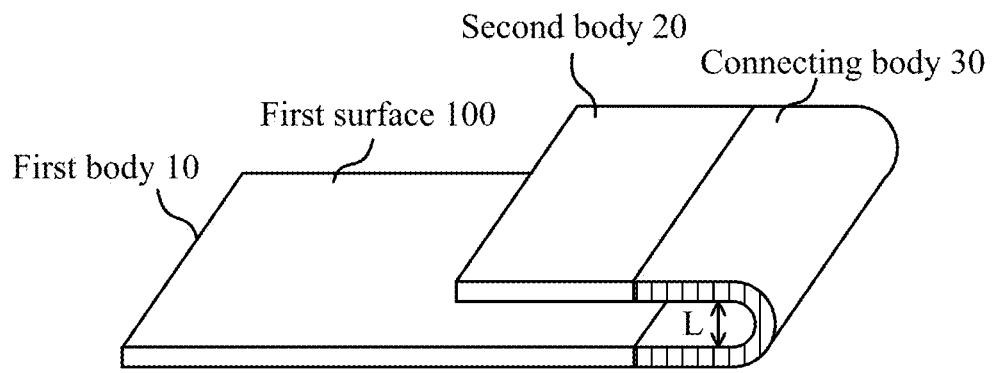
Figure 2C:
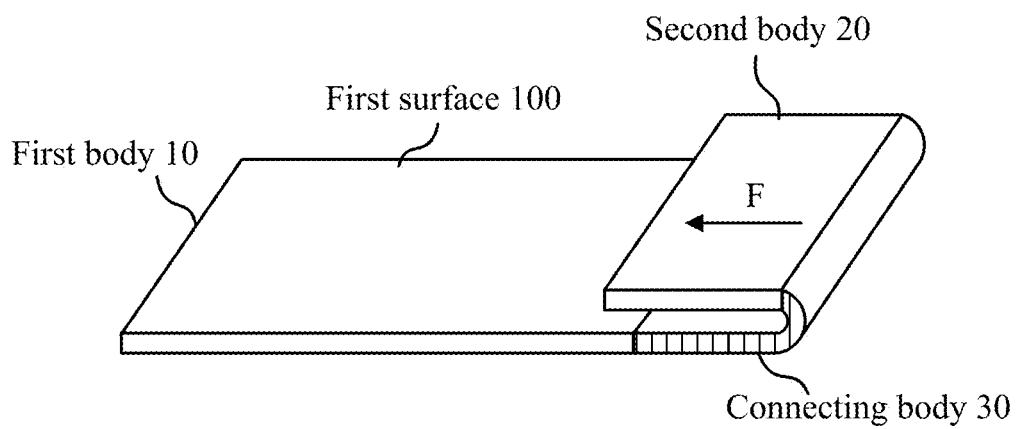

Specifically, FIGS. 2A to 2C are schematic diagrams illustrating a first mode, a switching process from the first mode to a second mode and a second mode of the electronic device 1 according to a first embodiment of the present disclosure. FIG. 2A illustrates the first mode of the electronic device 1 according to the first embodiment of the present disclosure, FIG. 2C illustrates the second mode of the electronic device according to the first embodiment of the present disclosure, and FIG. 2B illustrates an arbitrary mode during a switching process between the first mode and the second mode according to the first embodiment of the present disclosure.

As shown in FIG. 2A, in the first mode, a first surface 100 of the first body 10 is covered by the connecting body 30 and the second body 20. As shown in FIG. 2C, in the second mode, a surface composed by the first surface 1 of the first body 10 and a first surface 300 of the connecting body 30 is covered by the second body 20. As will be appreciated that, coverage in the first mode and the second mode comprises a total coverage and a partial coverage. Specifically, when the second body 20 is short enough, in the second mode shown in FIG. 2C, a surface composed by the first surface 100 of the first body 10 and a first surface 300 of the connecting body 30 being covered by the second body 20 may be that the second body 20 covers only the first surface 300 of the connecting body 30.

As shown in FIG. 2B, in an arbitrary mode in a switching process between the first mode and the second mode, because there is damping between respective members that compose the connecting body 30, so the arbitrary mode is a mode that can maintain stable without an external force. Based on the same reasons, in this case, the first mode and the second mode also are modes that can maintain stable without an external force. The present disclosure is not limited thereto, the first mode, the second mode, and the arbitrary mode during a switching process between the first mode and the second mode may probably be modes that require an external force to maintain stable. Configuration of the connecting body 30 will be described below in detail with reference to the accompanying drawings.

In addition, as shown in FIGS. 2A to 2C, in the first mode and the second mode, a maximum distance between corresponding points of the first body 10 and the second body 20 is less than a first predetermined threshold L. As will be appreciated, the corresponding points of the first body 10 and the second body 20 are a pair of interbody points of a straight line that vertically passes through a plane where the first body 10 and the second body 20 reside on the aforesaid plane. In the electronic device according to the first embodiment of the present disclosure as shown in FIGS. 2A to 2C, the first body 10 and the second body 20 are capable of being in an approximate fitting in the first mode, the second mode, and an arbitrary state between the two. That is, the first threshold L may be 5 mm or less.

In one case, in a process that the electronic device switches from the first mode to the second mode through the arbitrary mode, a distance between the sixth end 22 of the second body 20 and the first surface 100 of the first body 10 is maintained as smaller than the first predetermined threshold. The distance between the sixth end 22 of the second body 20 and the first surface 100 is a distance between any point on the sixth end 22 and a corresponding point on the first body 10.

In another case, when switching between the first mode and the second mode, a distance between the first surface 100 of the first body 10 and a first surface 200 of the second body 20 is also smaller than the first predetermined threshold. That is to say, in this case, the first body 10 and the second body 20, on the whole, slide relatively in parallel to execute mode switching. In the following, configuration of the connecting body 30 will be described with reference to the accompanying drawing to illustrate correspondence between a different mode switching process and configuration of the connecting body 30.

In addition, in the mode switching process shown in FIGS. 2A to 2C, an external force needs to be applied on the electronic device. Specifically, in the first mode shown in FIG. 2A, when an external force F that has a component in a direction from the sixth end 22 to the fifth end 21 is applied on the second body 20, and a magnitude of the component of the external force satisfies a first predetermined value, the electronic device switches from the first mode to the second mode. Likewise, in the second mode shown in FIG. 2C, when an external force F that has a component in a direction from the fifth end 21 to the sixth end 22 is applied on the second body 20, and a magnitude of the component of the external force satisfies a first predetermined value, the electronic device switches from the second mode to the first mode. As will be appreciated, the external force applied on the second body 20 of the electronic device is transmitted to the connecting body 30 to overcome the damping between respective members of the connecting body 30. Configuration of the connecting body 30 will be described below with reference to the accompanying drawing, to illustrate correspondence between the force that causes a mode switching to the electronic device and the configuration of the connecting body 30.

Figure 3:
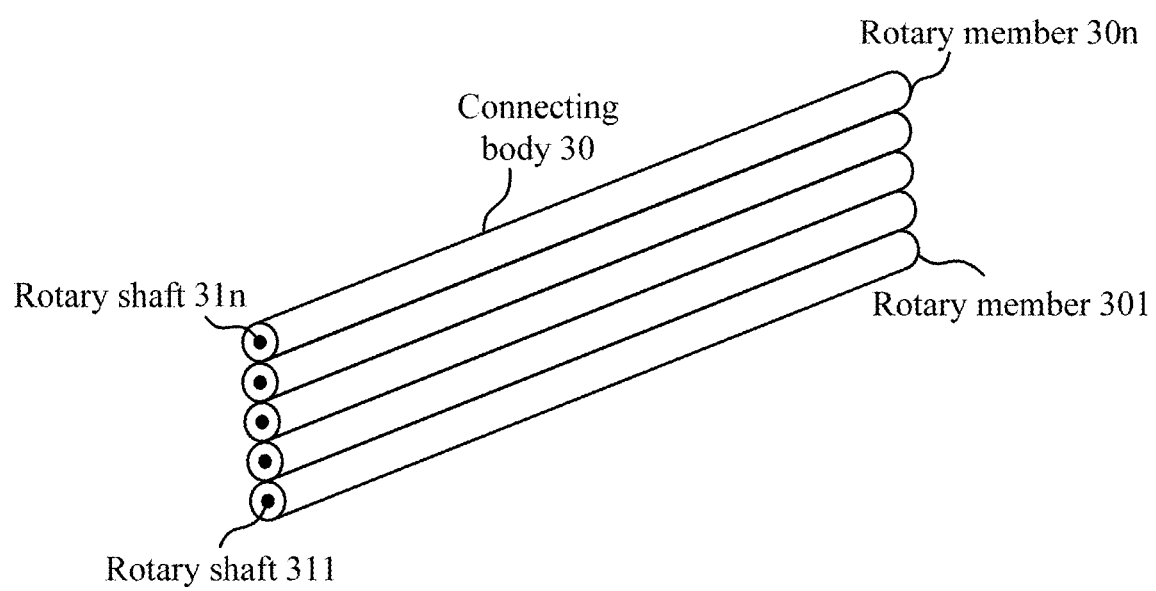
FIG. 3 is a schematic diagram further illustrating the connecting body according to the first embodiment of the present disclosure.

FIG. 3 is a schematic diagram further illustrating the connecting body according to the first embodiment of the present disclosure. As shown in FIG. 3, the connecting body 30 according to the first embodiment of the present disclosure may comprise at least three rotary members 301-30$n$ (n is an integer larger than or equal to 3), each of the at least three rotary members 301-30$n$ has a self-rotary shaft 311-31$n$, respective self-rotary shafts 311-31$n$ of the at least three rotary members 301-30$n$ are parallel to each other. For example, when an external force applied on one rotary member 301 is vertical to the self-rotary shaft 311 thereof and a magnitude of a component in a direction tangential to an outer surface of the one rotary member 301 satisfies a second predetermined value, the one rotary member 301 can rotate around the self-rotary shaft 311 thereof. Here, the second predetermined value is associated with manufacturing material, manufacturing process and other factors of the at least three rotary members 301-30$n$. In addition, when there is no external force that satisfies the second predetermined value on each of the at least three rotary members 301-30$n$, the at least three rotary members may 301-30$n$ probably maintain a mutual stability due to the damping, so as to ensure a relative stable state between the first body 10, the second body 20, and the connecting body 30 of the electronic device 1.

As shown above with reference to FIGS. 2A to 2C, the external force applied on the second body 20 is for making at least one rotary member in the connecting body 30 satisfy the aforesaid second predetermined value and thereby rotate around the self-rotary shaft thereof. Since in a process of transmitting the external force applied on the second body 20 to at least one rotary member in the connecting body 30, there may be a direction difference (that is, the direction from the sixth end 22 to the fifth end 21 may probably be different than the direction vertical to the self-rotary shaft thereof and tangential to an outer surface of the one rotary member) or other loss, the first predetermined value may be larger than the second predetermined value.

Furthermore, in the first embodiment of the present disclosure, the connecting body 30 according to the first embodiment of the present disclosure may be composed only by the at least three rotary members 301-30$n$. In addition, in an example of the first embodiment of the present disclosure, when one rotary member (e.g., rotary member 301) rotates, the other rotary members (rotary members 302-30$n$) rotate accordingly. For example, the at least three rotary members 301-30$n$ are gear members that engage with each other, when one gear member rotates, it will drive all other gear members that engage to rotate in linkage with the same line speed (with the same angular velocity in the case of the same radius). Alternatively, when all the rotary members rotate in linkage, rotation speeds of the respective rotary members (line speed and/or angular velocity) may probably be different due to different engagement manners and different friction and consumption of the respective rotary members. In addition, in another example of the first embodiment of the present disclosure, when one rotary member (e.g., rotary member 301) rotates, at least one of the other rotary members does not rotate, that is, not all the rotary members are in linkage, instead, there is at least one rotary member that is not in linkage.

In a case where all the rotary members of the connecting body 30 are in linkage, because rotation of one rotary member causes all the other rotary members to rotate at the same or different rotation speed, so in the mode switching process shown in FIGS. 2A to 2C, the first body 10 and the second body 20, on a whole, cannot maintain sliding in parallel, instead, since rotation of all the rotary members in the connecting body 30 has fluctuation. In contrast, in a case where there is at least one rotary member that is not in linkage in the connecting body 30, probably, only rotary members in a folded region of the connecting body 30 rotate, rotary members in the other regions of the connecting body 30 do not rotate in linkage, thus implementing the mode switching process shown in FIGS. 2A to 2C.

Figure 4A:
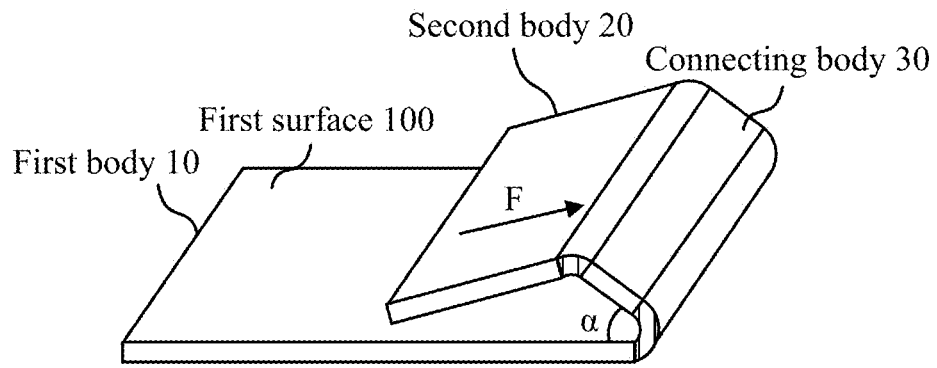
FIGS. 4A to 4C are schematic diagrams illustrating a switching process between the first mode and the second mode of the electronic device according to a second embodiment of the present disclosure.
Figure 4B:
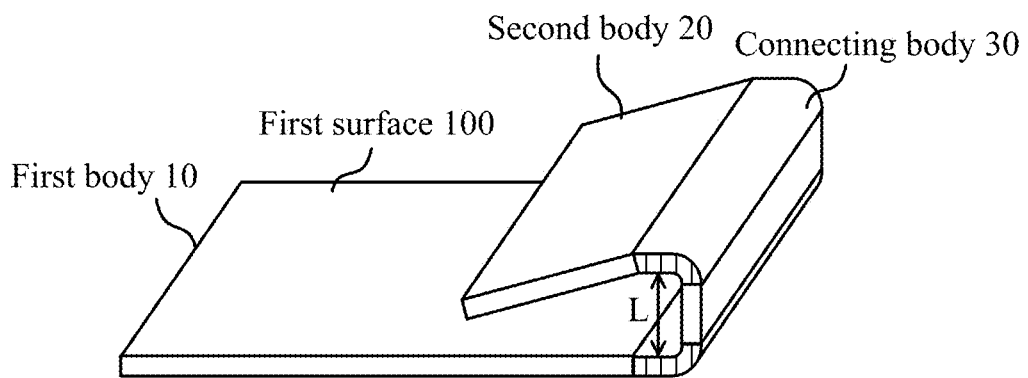
Figure 4C:
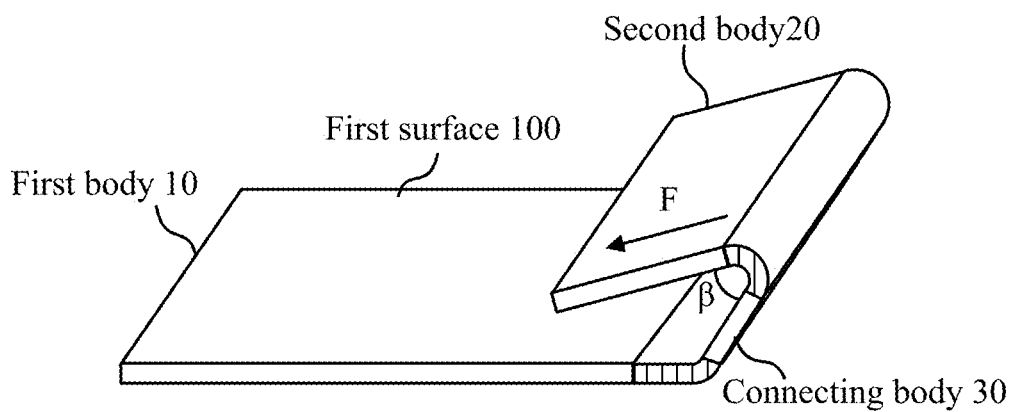

FIGS. 4A to 4C are schematic diagrams illustrating a switching process between the first mode and the second mode of the electronic device according to a second embodiment of the present disclosure. Specifically, FIG. 4A illustrates the first mode of the electronic device according to the second embodiment of the present disclosure, FIG. 4C illustrates the second mode of the electronic device according to the second embodiment of the present disclosure, and FIG. 4B illustrates an arbitrary mode during a switching process between the first mode and the second mode according to the second embodiment of the present disclosure.

Similar to the electronic device according to the first embodiment of the present disclosure shown in FIGS. 2A to 2C, as shown in FIG. 4A, in the first mode, a first surface 100 of the first body 10 is covered by the connecting body 30 and the second body 20. As shown in FIG. 4C, in the second mode, a surface composed by the first surface 100 of the first body 10 and a first surface 300 of the connecting body 30 is covered by the second body 20.

Likewise, similar to the electronic device according to the first embodiment of the present disclosure shown in FIGS. 2A to 2C, the arbitrary mode in a switching process between the first mode and the second mode may be is a mode that can maintain stable without an external force, or a mode that requires an external force to maintain stable.

It should be noted that, the electronic device according to the second embodiment of the present disclosure as shown in FIGS. 4A to 4C differs from the electronic device according to the first embodiment of the present disclosure as shown in FIGS. 2A to 2C in: since configuration of the connecting body 30 is different than that of the connecting body of the electronic device according to the first embodiment described with reference to FIG. 3, so in the process of switching from the first mode shown in FIG. 4A to the second mode shown in FIG. 4C, the first body 10 and the second body 20, on the whole, do not slide in parallel in an approximate fitting, instead, only the sixth end 22 of the second body 20 slides in an approximate fitting with the first body 10. That is to say, always there is a first angle α between the first surface 100 of the first body 10 and the first surface 200 of the second body 20, and always there is a second angle β between the second body 20 and the connecting body 30.

Although in the second embodiment of the present disclosure, the first body 10 and the second body 20, on the whole, do not slide in parallel in an approximate fitting, as shown in FIGS. 4A to 4C, in the first mode and the second mode, a maximum distance between corresponding points of the first body 10 and the second body 20 is also less than a first predetermined threshold. As will be appreciated, the first predetermined threshold in the second embodiment of the present disclosure will be larger than the first predetermined threshold in the first embodiment thereof, for example, the first predetermined threshold in the second embodiment of the present disclosure is 1 cm, its specific length mainly depends on the non-rotary member 60 in the connecting body 30. Likewise, in a process that the electronic device switches from the first mode to the second mode through the arbitrary mode, a distance between the sixth end 22 of the second body 20 and the first surface 100 is maintained as smaller than the first predetermined threshold.

In addition, in the mode switching process shown in FIGS. 4A to 4C, an external force needs to be applied on the electronic device. Specifically, in the first mode shown in FIG. 4A, when an external force F that has a component in a direction from the sixth end 22 to the fifth end 21 is applied on the second body 20, and a magnitude of the component of the external force satisfies a first predetermined value, the electronic device switches from the first mode to the second mode. Likewise, in the second mode shown in FIG. 4C, when an external force F that has a component in a direction from the fifth end 21 to the sixth end 22 is applied on the second body 20, and a magnitude of the component of the external force satisfies a first predetermined value, the electronic device switches from the second mode to the first mode. As already described above with reference to FIGS. 2A to 2C and 3, the first predetermined value may be larger than the second predetermined value.

Figure 5:
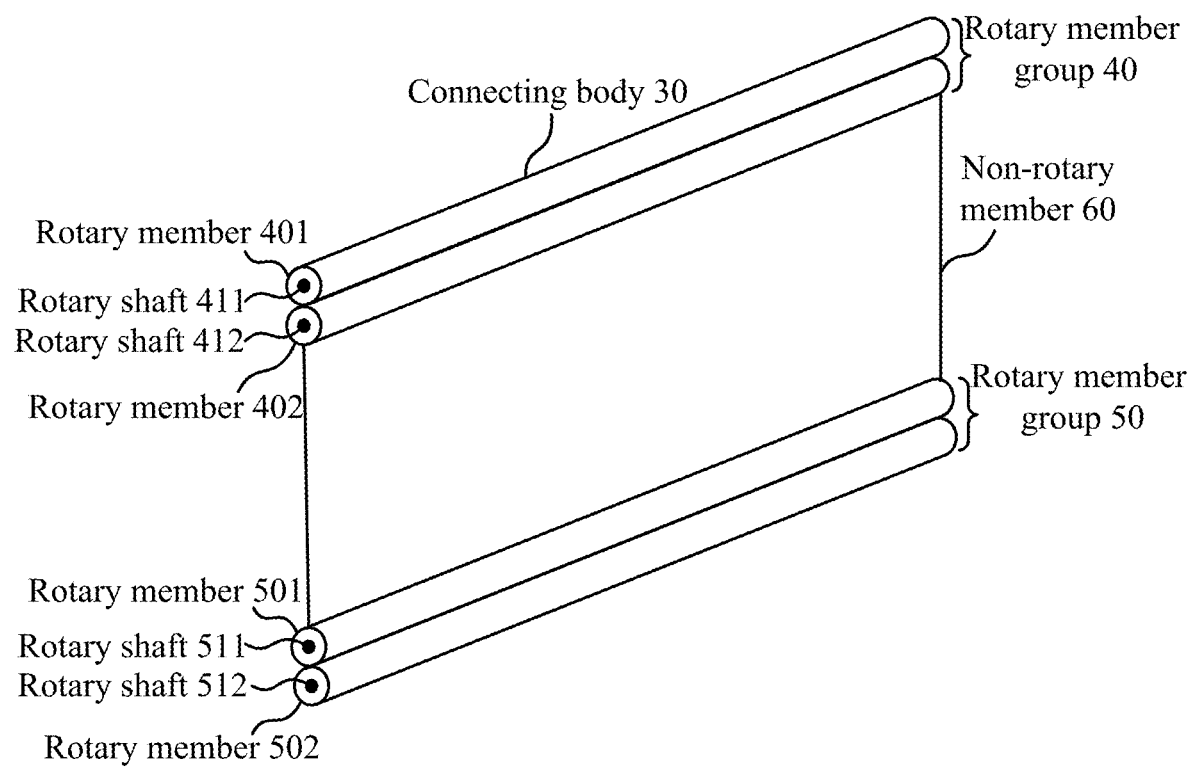
FIG. 5 is a schematic diagram further illustrating the connecting body according to the second embodiment of the present disclosure.

FIG. 5 is a schematic diagram further illustrating the connecting body according to the second embodiment of the present disclosure. As shown in FIG. 5, the connecting body 30 according to the second embodiment of the present disclosure comprises two rotary member groups 40 and 50 and at least one non-rotary member 60 between the two rotary member groups, each rotary member group 40 and 50 comprises at least two rotary members 401, 402, 501, 502. As described above, each of the at least two rotary members 401 and 402 (or 501 and 502) has a self-rotary shaft 411 and 412 (or 511 and 512), and respective self-rotary shafts 411 and 412 (or 511 and 512) of the at least two rotary members 401 and 402 (or 501 and 502) are parallel to each other. Likewise, for example, when an external force applied on one rotary member 401 is vertical to the self-rotary shaft 411 thereof and a magnitude of a component in a direction tangential to an outer surface of the one rotary member 401 satisfies a second predetermined value, the one rotary member 401 can rotate around the self-rotary shaft 411 thereof. In addition, when there is no external force that satisfies the second predetermined value on each of the rotary members of the two rotary member groups 40 and 50, the respective rotary members of the two rotary member groups 40 and 50 probably maintain a mutual stability due to the damping, so as to ensure the relative stable state between the first body 10, the second body 20, and the connecting body 30 of the electronic device 1.

Likewise, in an example of the second embodiment of the present disclosure, when one rotary member (e.g., rotary member 401 or 501) rotates, the other rotary members (rotary member 402 or 502) rotate accordingly. In addition, in another example of the second embodiment of the present disclosure, when the one rotary member (e.g., rotary member 401) rotates, the other rotary member 502 does not rotate. Different than that the connecting body 30 is totally composed by rotary members in the above first embodiment, since there is the non-rotary body 60 in the connecting body 30 of the second embodiment of the present disclosure, no matter the rotary members therein all rotate in linkage or there is a rotary member that does not rotate in linkage, the first body 10 and the second body 20, on the whole, do not maintain sliding in parallel in the whole mode switching process.

Figure 6A:
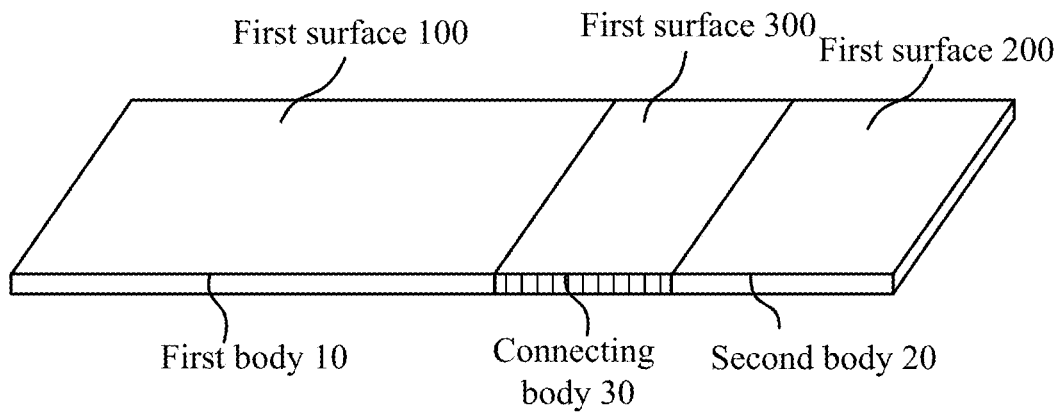
FIGS. 6A and 6B are schematic diagrams illustrating a third mode of the electronic device according to the first and second embodiments of the present disclosure.
Figure 6B:
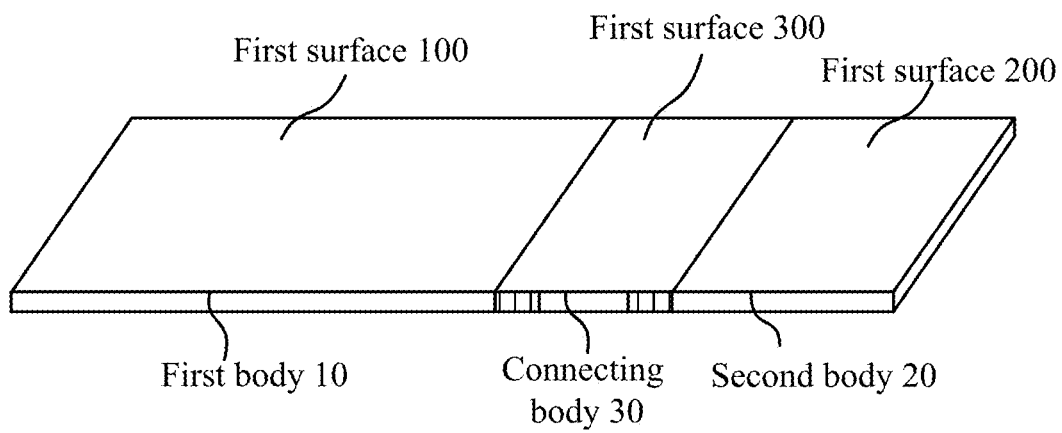

FIGS. 6A and 6B are schematic diagrams illustrating a third mode of the electronic device according to the first and second embodiments of the present disclosure. Specifically, FIG. 6A illustrates a case of the first embodiment where the connecting body 30 is composed by the at least three rotary members 301-30n, FIG. 6B illustrates a case of the second embodiment where the connecting body 30 comprises two rotary member groups 40 and 50 and at least one rotary member 60 between the two rotary member groups. As shown in FIGS. 6A and 6B, the electronic device further has a third mode, in which a first outer surface composed by the first surface 100 of the first body 10, the first surface 300 of the connecting body 30, and the first surface 200 of the second body 20 is flat or approximately flat. Specifically, thickness of the first body 10, thickness of the second body 20, and thickness of the connecting body 30 are strictly the same, and when the first body 10 and the connecting body 30, and the second body 20 and the connecting body 30 fully rotate relative to each other to reach that an angle therein between is 180 degrees, the first external surface is flat. When thickness of the first body 10, thickness of the second body 20, and thickness of the connecting body 30 are different, or the first body 10 and the connecting body 30, and the second body 20 and the connecting body 30 do not fully rotate relative to each other, and an angle therein between is less than 180 degrees (e.g., 175 to 180 degrees), the first external surface is approximately flat.

Figure 7A:
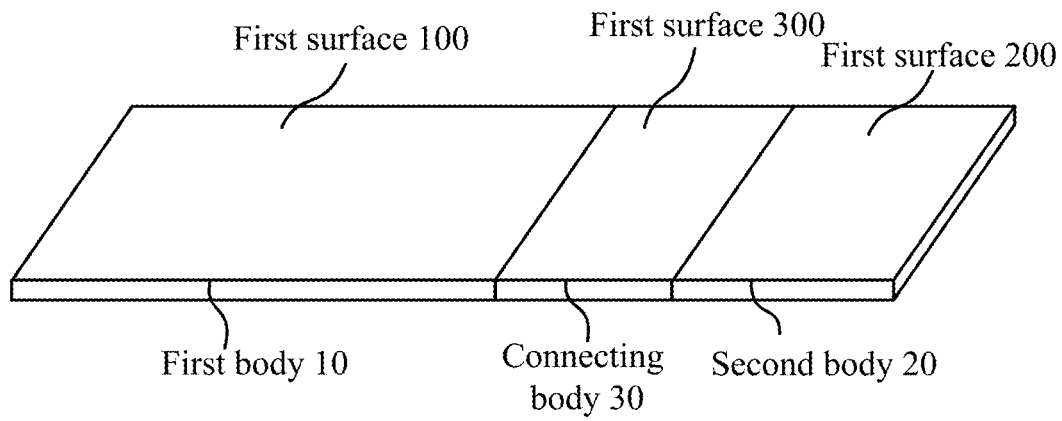
FIGS. 7A to 7C are schematic diagrams illustrating a switching process between the first mode and the third mode according to the first and second embodiments of the present disclosure.
Figure 7B:
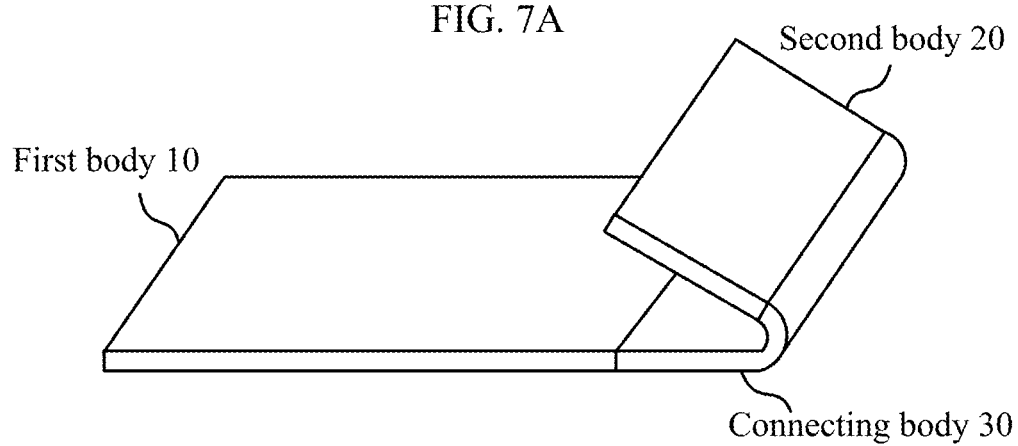
Figure 7C:
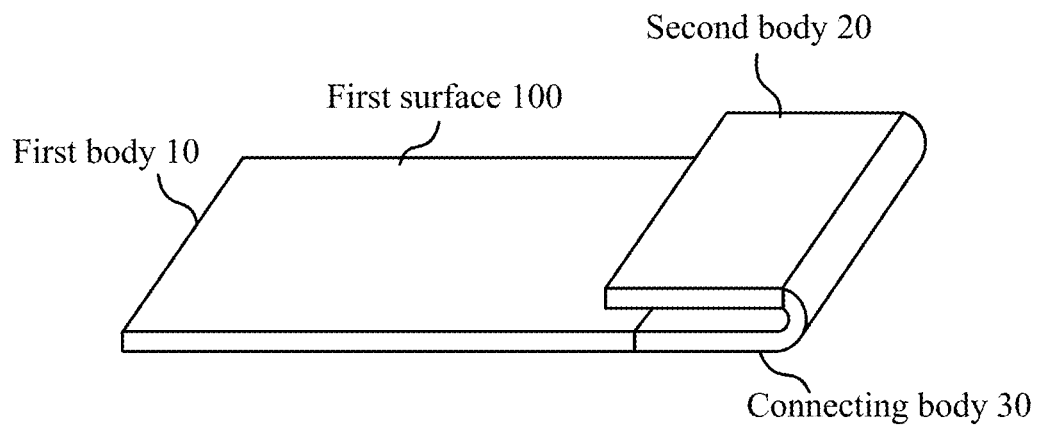

As described above, FIGS. 2A to 2C are schematic diagrams illustrating a switching process between a first mode and a second mode of the electronic device according to a first embodiment of the present disclosure, and FIGS. 4A to 4C are schematic diagrams illustrating a switching process between the first mode and the second mode of the electronic device according to a second embodiment of the present disclosure. It can be seen that, although in the first embodiment and the second embodiment, configuration of the connecting body 30 is different, the switching manner between the first mode and the second mode are the same. In addition, FIGS. 7A to 7C are schematic diagrams illustrating a switching process between the first mode and the third mode according to the first and second embodiments of the present disclosure. In FIGS. 7A to 7C, specific configuration of the connecting body 30 is not shown in particular, in other words, in FIGS. 7A to 7C, the connecting body 30 may adopt either the configuration in the first embodiment or the configuration in the second embodiment. Specifically, FIG. 7A illustrates the third mode of the electronic device of the present disclosure, FIG. 7C illustrates the first mode of the electronic device of the present disclosure, and FIG. 7B illustrates an arbitrary mode during the process of switching between the third mode and the first mode. From a comparison among FIGS. 2A to 2C, 4A to 4C, and 7A to 7C, it can be clearly seen that, the difference between the first manner and the second manner comprises: movement manner of the second body in the first manner and the second manner is different.

Hereinafter, different movement manners of the second body 20 in the first manner and the second manner will be explained from different angles.

First, it is possible to consider from the angle of different ways of force acting.

The electronic device 1 may be made to switch between the second mode and the first mode with a first manner. In the second mode, with the first manner, an external force that has a component in the direction from the fifth end 21 to the sixth end 22 is applied on the second body 20, and a magnitude of the external force satisfies the second predetermined value, that is, the external force is enough to make the second body 20 slide relative to the first body 10 through the connecting body 30, so that the electronic device switches from the second mode to the first mode. That is to say, in this case, with the first manner, the second body is acted upon by a push parallel to the first surface of the electronic device 1 and pointing from the fifth end 21 to the sixth end 22, in other words, the second body 20 is acted upon by a push for sliding in a direction of being close to the first body 10, so that the electronic device 1 switches from the second mode to the first mode. Of course, on the other hand, in the first mode, with the first manner, an external force that has a component in the direction from the sixth end 22 to the fifth end 21 is applied on the second body 20, and a magnitude of the external force satisfies the second predetermined value, that is, the external force is enough to make the connecting body 30 move, so that the electronic device switches from the first mode to the second mode. That is to say, in this case, with the first manner, the second body is acted upon by a push parallel to the first surface of the electronic device 1 and pointing from the sixth end 22 to the fifth end 21, in other words, the second body 20 is acted upon by a push for sliding in a direction of being away from the first body 10, so that the electronic device 1 switches from the first mode to the second mode.

The electronic device 1 may be made to switch between the third mode and the first mode with the second manner. In the third mode, with the second manner, an external force that has a component in the rotary direction from the sixth end 22 to be close to the first surface of the first body is applied on the second body 20, and a magnitude of the external force satisfies a third predetermined value, that is, the external force is enough to make the second body 20 rotate relative to the first body 10 through the connecting body 30, so that the electronic device switches from the third mode to the first mode. That is to say, in this case, with the second manner, the second body is acted upon by a push having a certain angle (for example, the angle is 90 degrees) with the first surface of the second body 20 and pointing from a rotary direction from the sixth end 22 to be close to the first surface of the first body 10, in other words, the second body 20 is acted upon by a push that rotates the second body 10 toward a direction of being close to the first surface of the first body 10, so that the electronic device 1 switches from the third mode to the first mode. Of course, on the other hand, in the third mode, with the second manner, an external force that has a component in the rotary direction from the sixth end 22 to be away from the first surface of the first body is applied on the second body 20, and a magnitude of the external force satisfies the third predetermined value, that is, the external force is enough to make the second body 20 rotate relative to the first body 10 through the connecting body 30, so that the electronic device switches from the first mode to the third mode. That is to say, in this case, with the second manner, the second body 20 is acted upon by a push having a certain angle (for example, the angle is 90 degrees) with the first surface of the second body 20 and pointing from a rotary direction from the sixth end 22 to be away from the first surface of the first body 10, in other words, the second body 20 is acted upon by a push that rotates the second body 10 toward a direction of being away from the first surface of the first body 10, so that the electronic device 1 switches from the first mode to the third mode.

Second, it is possible to consider from the angle of different movement directions.

The electronic device 1 may be made to switch between the second mode and the first mode with the first manner. In the second mode, with the first manner, the second body 20 and the first body 10 move relatively in parallel (in substance, totally parallel or approximately parallel), wherein an angle between the first body 10 and the second body 20 maintains constant and less than the second predetermined threshold, so that the electronic device 1 switches from the second mode to the first mode. For example, in the first embodiment, the second body 20 and the first body 10 move relatively in total parallel, so that the angle between the first body 10 and the second body 20 maintains constant and is zero. However, in the second embodiment, in an allowable range, the second body 20 and the first body 10 move relatively in approximate parallel, in this case, the angle between the first body 10 and the second body 20 maintains constant and is a, of course, a is a value smaller than the second predetermined threshold. On the other hand, in the first mode, with the first manner, the second body 20 and the first body 10 move relatively toward opposite directions, so that the electronic device 1 switches from the first mode to the second mode.

The electronic device 1 may be made to switch between the third mode and the first mode with the second manner.

In the third mode, with the second manner, the second body 20 and the first body 10 rotate relatively, wherein the angle between the first body 10 and the second body 20 reduces continuously, so that the electronic device switches from the third mode to the first mode. On the other hand, in the third mode, with the second manner, the second body 20 and the first body 10 rotate relatively in directions opposite to each other, wherein the angle between the first body 10 and the second body 20 increases continuously, so that the electronic device switches from the first mode to the third mode.

Thereafter, it is also possible to consider from the angle of different distances between the sixth end 22 and the first surface 100 of the first body 10 during a movement.

The electronic device 1 may be made to switch between the second mode and the first mode with the first manner. In the second mode, with the first manner, the second body 20 moves while maintaining the distance between the sixth end 22 and the first surface 100 of the first body 10 as smaller than the first predetermined threshold, so that the electronic device 1 switches from the second mode to the first mode. Of course, on the other hand, in the first mode, with the first manner, the second body 20 moves while maintaining the distance between the sixth end 22 and the first surface 100 of the first body 10 as smaller than the first predetermined threshold, so that the electronic device 1 switches from the first mode to the second mode. For example, the switching between the second mode and the first mode may be made with the first manner in a case where the body 20 and the first body 10 are in a complete fitting, in this case, the distance between the sixth end 22 and the first surface of the first body 10 is zero. Another example, it is also possible to make only the sixth end 22 of the second body 20 contact the first surface 100 of the first body 10 but the rest of the second body 20 does not contact, in this case, the distance between the sixth end 22 and the first surface of the first body 10 is a small value in an allowable range, that is, smaller than the first predetermined threshold.

The electronic device 1 may be made to switch between the third mode and the first mode with the second manner. In the third mode, with the second manner, the second body 20 moves while the distance between the sixth end 22 and the first surface of the first body 10 is made to increase from the second predetermined threshold to a maximum and then reduce to below the first predetermined threshold, so that the electronic device 1 switches from the third mode to the first mode. Specifically, in the third mode, if, as described above, the first surface 100 of the first body 10, the second surface 200 of the second body 10, and the third surface 300 of the third body 30 are in one plane strictly, then when switching from the third mode to the first mode with the second manner, first, the distance between the sixth end 22 and the first surface of the first body 10 is zero, that is, the second predetermined threshold is zero. Then, along that the second body rotates toward a direction of being close to the first body 10, the distance between the two increases gradually to the maximum, for example, the maximum is reached when the second body 20 and the first body 10 are vertical, thereafter, the distance between the two decreases gradually to the first predetermined threshold, that is, the minimum is reached when the second body 20 and the first body 10 are totally or essentially fitting. In the third mode, if, as described above, the first surface 100 of the first body 10, the second surface 200 of the second body 10, and the third surface 300 of the third body 10 are in one plane strictly, then when switching from the third mode to the first mode with the second manner, initially, the distance between the sixth end 22 and the first surface of the first body 10 is a non-zero small value. On the other hand, in the first mode, with the second manner, the second body 20 moves while the distance between the sixth end 22 and the first surface of the first body 10 is made to increase from below the first predetermined threshold to a maximum and then reduce to the second predetermined threshold, so that the electronic device switches from the first mode to the third mode.

In the above, for convenience of understanding, differences between the first manner and the second manner for changing a mode are explained from three different angles. However, the present disclosure is not limited thereto. As will be appreciated by those skilled in the art, any other possible angles may also be used similarly to explain the differences between the first manner and the second manner.

Figure 8A:
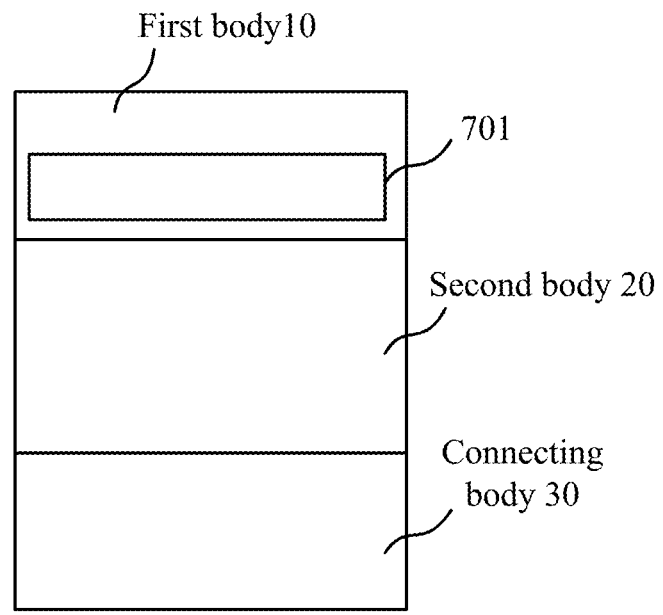
FIGS. 8A and 8B are schematic diagrams further illustrating the electronic device provided with a display.
Figure 8B:
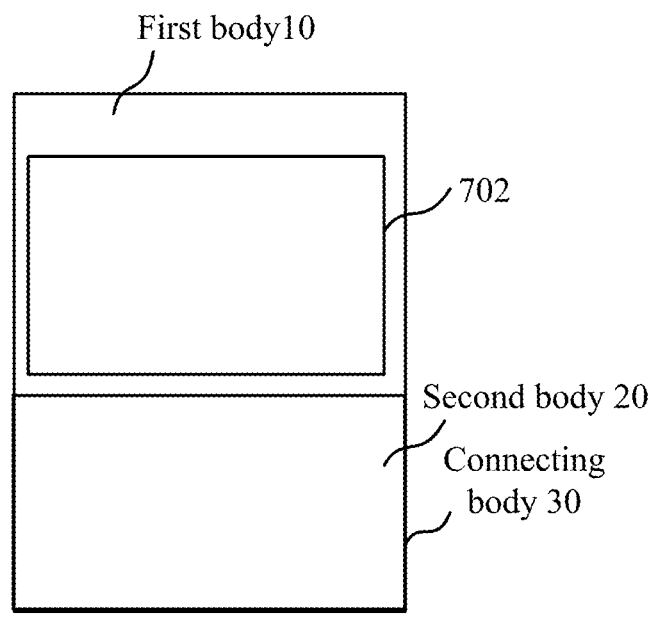

FIGS. 8A and 8B are schematic diagrams further illustrating the electronic device provided with a display. As shown in FIGS. 7A and 7B, the electronic device according to the first and second embodiments of the present disclosure further comprises a display 70 disposed at least on the first surface 100 of the first body 10. Further, as shown in FIGS. 7A and 7B, area of a first non-covered part 701 of the display 70 in the first mode is different than area of a second non-covered part 702 of the display 70 in the second mode.

Furthermore, as shown in FIGS. 8A and 8B, the display 70 is a deformable display, the display 70 is disposed at least in a region formed by the first surface 100 of the first body 10 and the first surface 200 of the second body 20; or the display 70 is disposed in a region formed by the first surface 100 of the first body 10, the first surface 300 of the connecting body 30, and the first surface 200 of the second body 20. In the first mode and the second mode described with reference to FIGS. 2A to 2C and 4A to 4C, one part of the display covers another part of the display 70.

Figure 9:
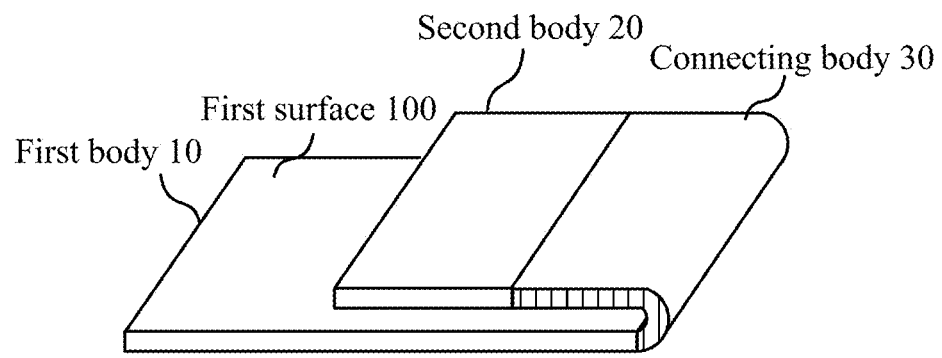
FIG. 9 is a side view schematically illustrating the first mode of the electronic device according to the first embodiment of the present disclosure.
Figure 10:
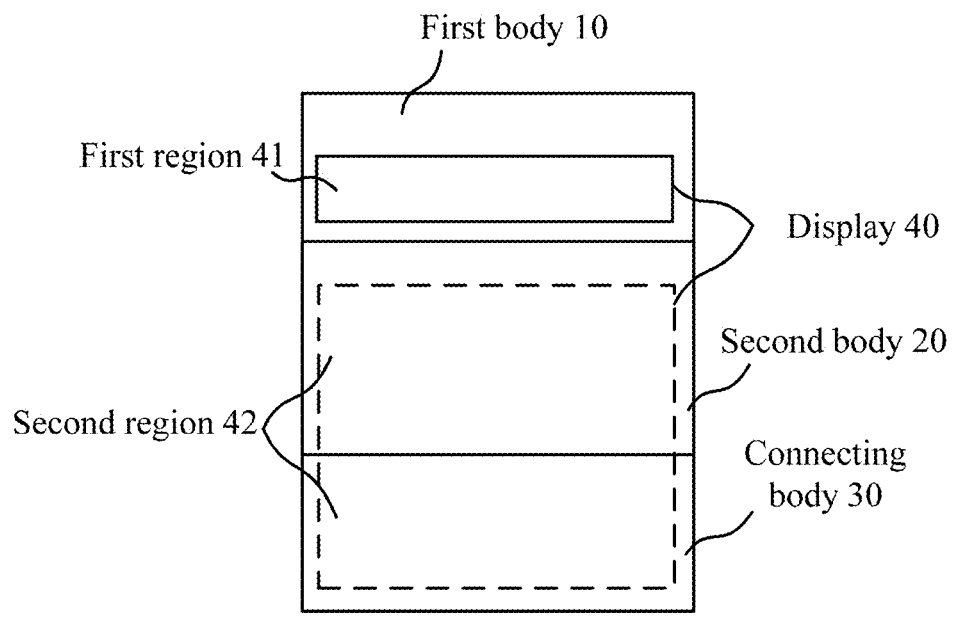
FIG. 10 is a plan view schematically illustrating the first mode of the electronic device according to the first embodiment of the present disclosure.

Hereinafter, the electronic device 1 according to the first embodiment of the present disclosure will be described in detail with reference to FIGS. 9 and 10. FIG. 9 is a side view schematically illustrating the first mode of the electronic device according to the first embodiment of the present disclosure. FIG. 10 is a plan view schematically illustrating the first mode of the electronic device according to the first embodiment of the present disclosure.

As shown in FIGS. 9 and 10, the electronic device 1 has a first mode, in which the first surface 100 of the first body 10 and the first surface 200 of the second body 20 are in a parallel state or an approximately parallel state, and a first region 41 of the display 40 can be perceived.

It should be noted that, although in FIG. 10 the first mode of the electronic device 1 is shown as that the first body 10 and the second body 20 are parallel (i.e., the first surface 100 of the first body 10 and the first surface 200 of the second body 20 are parallel), the present disclosure is not limited thereto. In the first mode of the electronic device 1, the first body 10 and the second body 20 may be approximately parallel, that is to say, the second body 20 may be tilted slightly toward the position of the first body 10, so that the first surface 100 of the first body 10 and the first surface 200 of the second body 20 form a certain angle, or the second body 20 may be tilted slightly away from the position of the first body 10, so that the first surface 100 of the first body 10 and the first surface 200 of the second body 20 also form a certain angle. For example, the angle is between 0 to 30 degrees, but the present disclosure is not limited thereto, those skilled in the art can set the aforesaid two tilting directions and angles as actually needed, as long as the first region 41 of the display 40 can be perceived in the first mode.

For example, in the first mode, a second region 42 (shown with dotted lines in FIG. 10) of the display 40 cannot be perceived while the first region 41 of the display 40 can be perceived. The "cannot be perceived" may refer to that when the electronic device 1 in the first mode, a user of the electronic device cannot see or clearly see content displayed in the second region 42 of the display 40, or when the electronic device 1 in the first mode, a user of the electronic device cannot touch the second region 42 of the display 40.

For example, in the first mode, the first region 41 of the display 40 is not covered by the second body 20, and the second region 42 of the displayed is covered by the second body 20. In the first mode shown in FIG. 9, the second body 20 and the first body 10 are parallel, thus the second region 42 of the display 40 is totally covered by the second body 20, whereas the first region 41 of the display 40 is not covered by the second body 20. Since the second region 42 is covered by the second body 20, the user at least cannot touch the second region 42. It should be noted that, although FIG. 9 shows a case where the second region 42 is covered by the second body 20, those skilled in the art does not necessarily deduce that the display content in the second region 42 of the display 40 is invisible. For example, when the second body 20 is made from transparent material such as glass, transparent plastic, in the first mode shown in FIG. 9, the user can still see display content in the second region 42 of the display 40 through the display 40. Alternatively, when the second body is made from translucent material such as translucent resin, the user can still see the display content in the second region 42 through the second body 20, but in this case, legibility of the display content in the second region 42 is not high.

For example, the connecting body 30 has a rotary shaft (not shown in FIG. 9), and the first body 10 and the second body 20 have different lengths in a direction vertical to the rotary shaft. As shown in FIG. 9, a length of the first body 10 in a direction vertical to the rotary shaft is L1, a length of the second body 20 in a direction vertical to the rotary shaft is L2, and L1>L2. In this case, when the user rotates the second body 20 along the rotary shaft of the connecting body 30 relative to the first body, it is impossible for the second body 20 to totally cover the first body 10, that is, the user can perceive the first region 41 of the display 40.

It should be noted that, although it is shown in the above that the length L1 of the first body 10 is larger than the length L2 of the second body 20, the present disclosure is not limited thereto, the length L1 of the first body 10 may be smaller than the length L2 of the second body 20, in this case, since the connecting body 30 also has a certain length in a direction vertical to the rotary shaft, the second body 20 still can rotate relative to the first body 10 to cover a part of region of the first body 10, so that the user can perceive the first region 41 of the display 40. In addition, in this case, the user can finally effectuate a parallel or relatively parallel state between the first surface 100 of the first body 10 and the first surface 200 of the second body 20 in a manner of rotating the first body 10 along the rotary shaft of the connecting body 30 relative to the second body 20, so that a part of the display disposed on the second body 20 can be perceived.

In addition, it should be noted that, to better explain the first mode, FIG. 10 shows the second display region 42 as being covered by the second body 20 and the connecting body 30, however, those skilled in the art can deduce from the description and teaching of the embodiments described above that the second region 42 may be covered only by the second body 20 but not covered by the connecting body 30.

In addition, in this embodiment, it is also shown that the display 40 is disposed only on the first surface 100 of the first body 10, however, the present disclosure is not limited thereto, the display 40 may be disposed on the first surface 100 of the first body 10 and the third surface 300 of the third body 30, or disposed on a first outer surface (composed by the first surface 100 of the first body 10, the first surface 300 of the connecting body 30, and the first surface 200 of the second body 20) of the electronic device 1.

Figure 11:
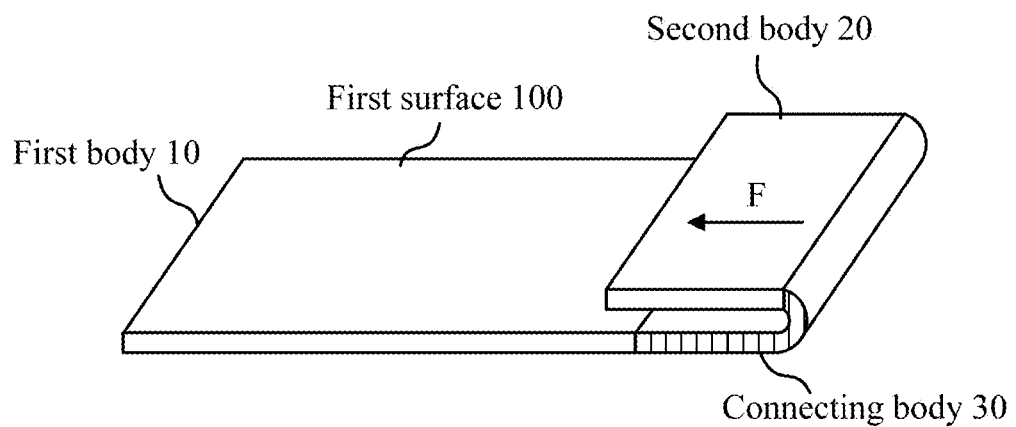
FIG. 11 is a side view schematically illustrating the second mode of the electronic device according to the first embodiment of the present disclosure.
Figure 12:
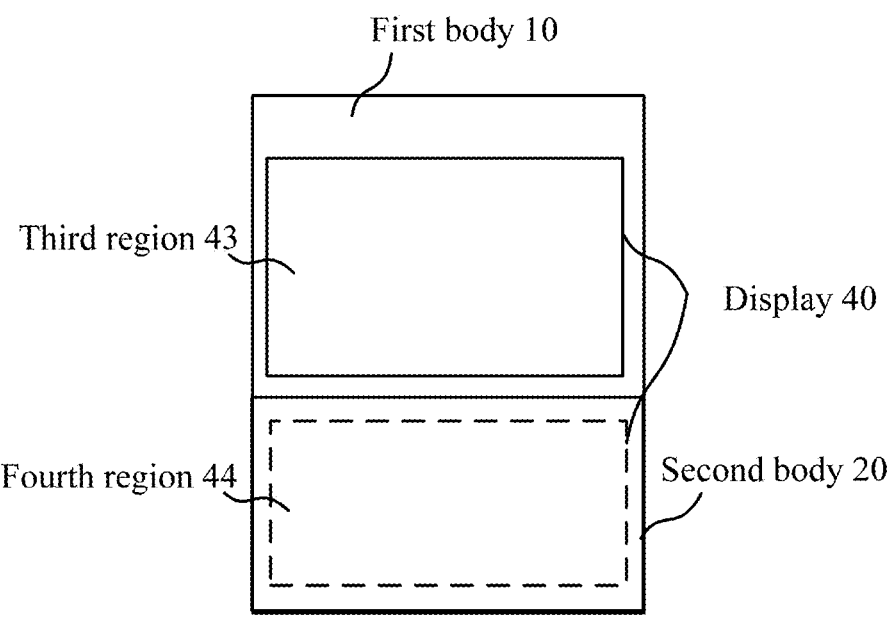
FIG. 12 is a plan view schematically illustrating the second mode of the electronic device according to the first embodiment of the present disclosure.

The electronic device may have a second mode. The second mode of the electronic device 1 according to the first embodiment of the present disclosure will be described below in detail with reference to FIGS. 11 and 12. FIG. 11 is a side view schematically illustrating the second mode of the electronic device according to the first embodiment of the present disclosure. FIG. 12 is a plan view schematically illustrating the second mode of the electronic device according to the first embodiment of the present disclosure.

In the second mode shown in FIGS. 11 and 12, the first surface 100 of the first body 10 and the first surface 200 of the second body 20 are in a parallel state or in an approximately parallel state, and a third region 43 of the display 40 can be perceived, and the third region 43 is different than the first region 41.

Although the second mode of the electronic device 1 is shown as that the first body 10 and the second body 20 are parallel (i.e., the first surface 100 of the first body 10 and the first surface 200 of the second body 20 are parallel), like the description of the first mode provided above with reference to FIGS. 9 and 10, the first body 10 and the second body 20 may also be approximately parallel, that is to say, the first surface 100 of the first body 10 and the first surface 200 of the second body 20 form a certain angle. For example, the angle is also between 0 to 30 degrees, but the present disclosure is not limited thereto, those skilled in the art can set a degree of the angle as actually needed, as long as the third region 43 of the display 40 can be perceived in the second mode.

As shown in FIG. 12, in the second mode, the third region 43 of the display 40 is not covered by the second body 20, and a fourth region 44 of the display 40 is covered by the second body 20. Similar to the first mode described above, since the fourth region 44 is covered by the second body 20, the user at least cannot touch the fourth region 44. Although FIG. 12 shows a case where the fourth region 44 is covered by the second body 20, those skilled in the art does not necessarily deduce that the display content in the fourth region 44 of the display 40 is invisible. For example, when the second body 20 is made from transparent material such as glass, transparent plastic, in this way, the user can still see display content in the fourth region 44 of the display 40 through the display 40. As shown in FIG. 12, because the region covered by the first body 20 of the first body 10 in the second mode is smaller than in the first mode, the third region 43 of the display 40 is larger than the first region 41.

Although in the case described with reference to FIGS. 11 and 12, the third region 43 of the display 40 is larger than the first region 41, the present disclosure is not limited thereto, the third region 43 may be smaller than the first region 41. For example, as described above, in the case where the length L1 of the first body 10 is smaller than the length L2 of the second body 20, when the user rotates the first body 10 and makes it cover the second body 20, since the first body 10 cannot totally cover the second body 20, a part of region of the display disposed on the second body 20 can be perceived, such part of region of the display may be regarded as the third region, and the third region may be smaller than the first region 41 in appropriate circumstances.

In addition, it should be also noted that, to better explain the second mode, FIG. 12 shows the fourth region 44 as being covered only by the second body 20, however, those skilled in the art can deduce form the description and teaching of the embodiments described above that, the fourth region 44 may be covered by the connecting body 30 (i.e., covered by the second body 20 and the connecting body 30). In addition, as described above, the display 40 may be disposed on the first surface 100 of the first body 10 and the third surface 300 of the third body 30, or disposed on a first outer surface of the electronic device 1.

Figure 13A:
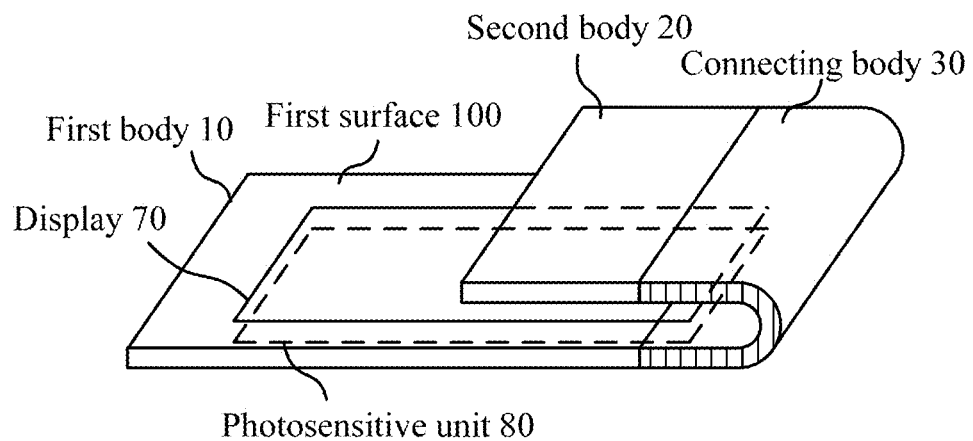
FIGS. 13A and 13B are schematic diagrams further illustrating the electronic device provided with a sensor.
Figure 13B:
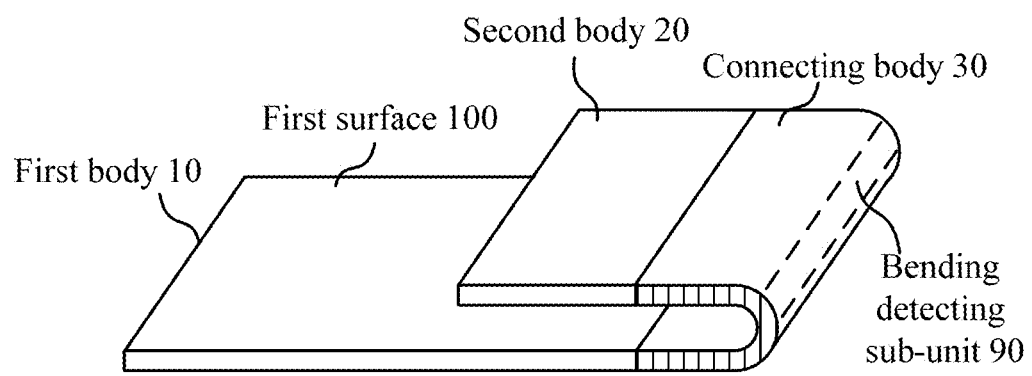

FIGS. 13A and 13B are schematic diagrams further illustrating the electronic device provided with a sensor. As described above with reference to FIGS. 1 to 12, the electronic device according to the embodiments of the present disclosure have multiple different operating modes (such as the first mode, the second mode, and the third mode), and as shown in FIGS. 8A to 12, in different operating modes, the display 70 disposed on the electronic device will be covered differently, thus there are different exposed regions. Therefore, multiple different operating modes of the electronic device may correspond to different operating manners, and different display content may be provided to the display 70 according to different operating manners.

Therefore, the electronic device may further comprise a sensor (not shown) disposed in the first body 10 and/or the connecting body 30 and/or the second body 20, and configured to detect a mode of the electronic device; and a processor (not shown) disposed in the first body 10 and/or the connecting body 30 and/or the second body 20, and configured to control a mode switching of the electronic device according to a mode detected by the sensor.

Specifically, in an embodiment of the present disclosure, as shown in FIG. 13A, the sensor comprises a photosensitive unit 80, the photosensitive unit 80 comprises a light detecting array disposed corresponding to a light emitting array of the display 70, and is configured to determine an exposed region of the display according to a region that satisfies a predetermined luminance threshold in the light detecting array, so as to determine a mode of the electronic device. This is because in different modes of the electronic device, the display is differently covered by the connecting body 30 and/or the second body 20, and thereby has a different exposed region. Only the part disposed under the outer region of the light detecting array will sense entry of light that satisfies the predetermined luminance threshold, and the light sensed by the other covered part of the light detecting array does not satisfy the predetermined luminance threshold. Therefore, the part that detects the light that satisfies the predetermined luminance threshold of the light detecting array corresponds to an exposed region of the display 70 in a current mode.

In addition, the photosensitive unit 80 may further determine whether a size of the part sensing the light that satisfies the predetermined luminance threshold of the light detecting array increases gradually or sharply. If the photosensitive unit 80 determines a size of the part sensing the light that satisfies the predetermined luminance threshold of the light detecting array increases gradually, it should be determined that mode is switched with the first manner. On the other hand, if the photosensitive unit determines size of the part sensing the light that satisfies the predetermined luminance threshold of the light detecting array increases sharply, it should be determined that mode is switched with the second manner.

In another embodiment of the present disclosure, as shown in FIG. 13B, the sensor comprises a bending detecting sub-unit 90 disposed in the connecting body 30 and configured to determine a mode of the electronic device according to a state of the connecting body 30. For example, the bending detecting sub-unit 90 may be an angle sensor that senses a current bending angle of the connecting body 30. By setting specific dimensions of the first body 10, the connecting body 30, and the second body 20 in advance, after the current bending angle of the connecting body 30 is sensed, it is possible to thereby determine a current mode of the electronic device.

In addition, the bending detecting sub-unit 90 may further detect rotation of the rotary shafts comprised in the connecting body 30. Specifically, as described above, the connecting body 30 may comprise multiple rotary shafts. For example, if the bending detecting sub-unit 90 detects that only some rotary shafts among the multiple rotary shafts rotate while the rest do not, and the rotary shafts that rotate change in sequence (e.g., 311, 312, 313 at a current moment, 312, 313, 314 in a next moment), then it should be determined that mode is switched with the first manner. On the other hand, if the bending detecting sub-unit 90 detects that all rotary shafts among the multiple rotary shafts rotate, then it should be determined that mode is switched with the second manner.

In addition, in an embodiment of the present disclosure, the processor comprises a processor (not shown), which may switch display content on the display according to a mode switching of the electronic device, and thereby adaptively provides the user with a display that best suits a current manner of the electronic device.

For example, in one example of the disclosure, during a switching process between the first mode and the second mode of the electronic device according to the first embodiment as shown in FIGS. 2A-2C or the second embodiment as shown in FIGS. 4A-4C, as shown in FIGS. 8A and 8B, in different modes, the display 70 arranged on the electronic device will be covered differently, and thus forming exposed regions with different sizes. Specifically, as shown in FIG. 7A, in the first mode, the electronic device may have a smaller exposed region 701. On the condition that the display 70 cannot be controlled according to regions or gradually illuminated according to regions, when the sensor detects that the electronic device is changing from the first mode to the second mode, for example when the sensor 80 as shown in FIG. 8A detects that a region that satisfies a predetermined luminance threshold in the light detecting array is gradually increasing or when the bending detection sub-unit 90 as shown in FIG. 8B detects that the bending angle of the connecting body 30 is changing, the processor may control the display content on the display 70 to remain unchanged, that is, during the mode switching process, the processor may control the display 70 to keep only the display region 701 illuminated and display only on the display region 701. After the sensor detects that the whole mode switching process is completed, that is, after the electronic device is in the second mode, the electronic device has a larger exposed region 702. Then, the processor controls the display 70 to illuminate the entire exposed region 702, and display richer interface content on the entire display region 702. In one example of the disclosure, when the sensor detects that the whole mode switching process has been completed for a predetermined period of time, that is, when the sensor detects that the electronic device is in the second mode and the second mode has been kept for a predetermined period of time, the processor controls the display 70 to illuminate the entire exposed region 702, and display on the entire display region 702. The predetermined period of time may be default or set by user based on requirements. For example, the predetermined period of time may be set as 1 second.

Similarly, when the sensor detects that the electronic device is changing from the second mode to the first mode, the processor may first control the display content on the display 70 to remain unchanged, that is, during the mode switching process, the processor may control the display 70 to keep the entire display region 702 illuminated and display on the entire display region 702. After the sensor detects that the whole mode switching process is completed, that is, after the electronic device is in the first mode, the electronic device has only a smaller exposed region 701. Then, the processor controls the display 70 to illuminate only the exposed region 701, and display only simple information and/or instant messages on the display region 701. In one example of the disclosure, when the sensor detects that the whole mode switching process has been completed for a predetermined period of time, that is, when the sensor detects that the electronic device is in the first mode and the first mode has been kept for a predetermined period of time, the processor controls the display 70 to illuminate the smaller exposed region 701, and display only simple information and/or instant messages on the display region 701.

In another example of the present disclosure, the display 70 of the electronic device 1 may be controlled by the processor to display content according to regions or to be gradually illuminated according to regions. When the sensor detects that the electronic device is changing from the first mode to the second mode, for example when the sensor 80 as shown in FIG. 8A detects that a region that satisfies a predetermined luminance threshold in the light detecting array is gradually increasing or when the bending detection sub-unit 90 as shown in FIG. 8B detects that the bending angle of the connecting body 30 is changing, area increment of the exposed region of the display on the first body 10 may be calculated according to the position of the part of the light detecting array that satisfies the predetermined luminance threshold or according to specific sizes of the first body 10, the connecting body 30 and the second body 20 and current bending angle of the connecting body 30. Each time the sensor detects that the exposed region of the display on the first body is increased, the processor may control the display 70 of the first body to illuminate the current exposed region of the display 70, and the processor may control the display content on the display 70 to be richer as the exposed region of the display 70 becomes larger. When the sensor detects that the mode switching process is completed, that is, the electronic device is in the second mode, the processor controls the display 70 to illuminate the entire exposed region 702, and display on the entire display region 702. The predetermined area may be default or set by user based on requirements. For example, the predetermined area may be set as 4 cm2.

Similarly, when the sensor detects that the electronic device is changing from the second mode to the first mode, for example when the sensor 80 as shown in FIG. 8A detects that a region that satisfies a predetermined luminance threshold in the light detecting array is gradually decreasing or when the bending detection sub-unit 90 as shown in FIG. 8B detects that the bending angle of the connecting body 30 is changing, area decrement of the exposed region of the display on the first body 10 may be calculated according to the position of the part of the light detecting array that satisfies the predetermined luminance threshold or according to specific sizes of the first body 10, the connecting body 30 and the second body 20 and current bending angle of the connecting body 30. Each time the sensor detects that the exposed region of the display on the first body is decreased, the processor may control the display 70 of the first body to illuminate the decreased exposed region of the display 70, and the processor may control the display content on the display 70 to be simpler as the exposed region of the display 70 becomes smaller. When the sensor detects that the mode switching process is completed, that is, the electronic device is in the first mode, the electronic device only has a smaller exposed region 701. Then, the processor controls the display 70 to illuminate only the smaller exposed region 701, and display only simple information and/or instant messages on the display region 701. As stated above, the predetermined area may be default or set by user based on requirements.

Next, different examples of switching of display content during a mode switching will be described in detail.

As a first example, suppose that in the second mode, the display 70 displays a third content. When the sensor detects that the electronic device 1 switches from the second mode to the first mode with the first manner described above, the processor controls the display 70 to switch from displaying the third content to displaying a first content.

Because, as described above, area of a first non-covered part of the display in the first mode is smaller than area of a second non-covered part of the display in the second mode, thus, the first content that can be displayed in the first mode certainly is less than the second content that can be displayed in the second mode. Here, the first content is a part of the third content, and the first content is different than a first sub-content of the third content, the first sub-content is a content displayed in the second mode in the region where the first content resides. That is to say, although the first content is a part of the third content, it is not simply cutting the third content as it is, instead, it is a simplified re-combination of respective items in the third content. That is to say, when switching from the second mode to the first mode with the first manner, it is possible to switch the electronic device to a more simplified operating manner.

Figure 14A:
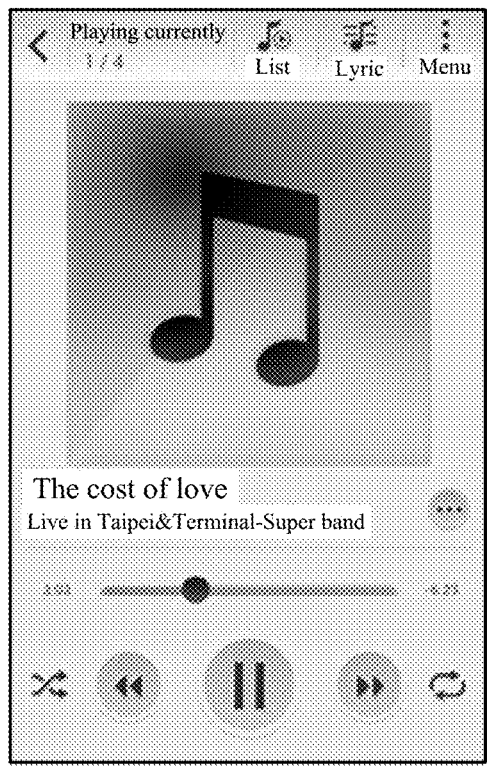
FIG. 14A illustrates an example of display content when an exposed region (the non-covered part) of the display is large.
Figure 14B:
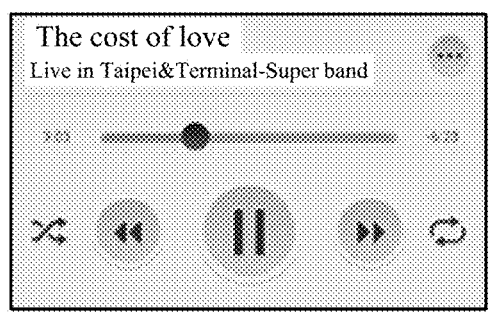
FIG. 14B illustrates an example of display content when an exposed region (the non-covered part) of the display is small.

For example, FIG. 14A shows an example of the display content when the exposed region (i.e., non-covered part) of the display 70 is large, whereas FIG. 14B shows another example of the display content when the exposed region (i.e., non-covered part) of the display 70 is small. As shown in FIGS. 14A and 14B, the third content may be a complete content that comprises playback control buttons (comprising play, pause, fast forward, etc.), a playback progress bar, lyrics, album covers, etc., and the first content may be a simplified content that comprises only the playback control buttons and the playback progress bar. Of course, in the first content, layout of the playback control buttons and the playback progress bar needs to be re-arranged.

It is usually recognized that, when the user changes from the second mode to the first mode with the first manner, there is a high possibility for the user to desire to further operate the electronic device, and since valid area that executes displaying of the display reduces, thus displaying is switched to the simplified content display to facilitate further operating of the user.

On the other hand, suppose in the first mode, the display 70 displays the first content. When the sensor detects that the electronic device 1 switches from the first mode to the second mode with the first manner described above, the processor controls the display 70 to switch from displaying the first content to displaying the third content.

As a second example, suppose in the third mode, the display 70 displays a fourth content, when the sensor detects that the electronic device 1 switches from the third mode to the first mode with the second manner described above, the processor controls the display 70 to switch from displaying the fourth content to displaying a second content.

Figure 14C:
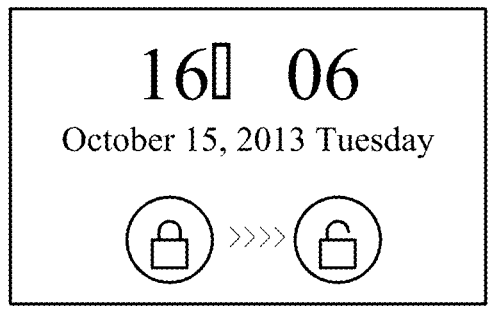
FIG. 14C illustrates another example of display content when an exposed region (the non-covered part) of the display is small.

Different than that the first content and the third content in the first example are relevant, in the second example, the second content is predetermined content, and the second content is irrelevant to the fourth content. Switching from the third mode to the first mode with the second manner can switch the electronic device to an operating manner requiring less power consumption and/or less operation procedures. For example, FIG. 14A shows an example of the display content when the exposed region (i.e., non-covered part) of the display 70 is large, whereas FIG. 14C shows another example of the display content when the exposed region (i.e., non-covered part) of the display 70 is small. As shown in FIGS. 14A and 14C, the fourth content may be also a complete content that comprises playback control buttons (comprising play, pause, fast forward, etc.), a playback progress bar, lyrics, album covers, etc., and the second content may be a screen lock interface.

It is usually recognized that, when the user changes the second mode to the third mode with the second manner, there is a high possibility for the user to desire to not operate the electronic device any more, thus the electronic device is directly switched to a screen lock manner and the display displays a screen lock interface so as to reduce power consumption effectively.

On the other hand, suppose in the first mode, the display 70 displays the second content. When the sensor detects that the electronic device 1 switches from the first mode to the third mode with the second manner described above, the processor controls the display 70 to switch from displaying the second content to displaying the fourth content.

In the above, situations of switching between the first mode and the second mode with the first manner and switching between the first mode and the third mode with the second manner are respectively illustrated with two independent examples. However, it is also possible to combine the first example and the second example, that is, in one example, the situations of switching between the first mode and the second mode with the first manner and switching between the first mode and the third mode with the second manner are both comprised.

As a third example, suppose in the second mode, the display 70 displays a fifth content. When the sensor detects that the electronic device 1 switches from the first mode to the second mode with the first manner described above, the processor controls the display 70 to switch from displaying the fifth content of the first disclosure to displaying a sixth content of the first application. And suppose in the third mode, the display 70 displays a seventh content of the first application. In the third example, what should be focused on is that display content will be different when switching to the first mode with different manners (the first manner or the second manner) in a case where the same application is displayed in the first mode and the third mode. Here, it should be noted that, since area of the second non-covered part of the display in the second mode is smaller than area of the third non-covered part of the display in the third mode, thus even if the same application is displayed in the second mode and third mode, content of the same application will be different slightly. Therefore, in the above, the two are differentiated with the fifth content of the first application and the seventh content of the first application. When the detecting unit detects that the electronic device 1 switches from the third mode to the first mode with the second manner, the processor controls the display 70 to switch from displaying the seventh content of the first application to displaying an eighth content of a non-first application, wherein the eighth content of a non-first application is irrelevant to the seventh content of the first application. For example, the eighth content of a non-first application may be a screen lock interface.

In this way, when the user changes the second mode to the first mode with the first manner, there is a high possibility for the user to desire to further operate the electronic device, and when the user changes the third mode to the first mode with the second manner, there is a high possibility for the user to desire to not operate the electronic device any more, thus the processor is configured to switch the display content from the fifth content of the first application to the sixth content thereof when switching the second mode to the first mode with the first manner, wherein the sixth content and the fifth content are relevant, so as to facilitate further operating of the user, and the processor is configured to switch the display content from the seventh content of the first application to the eighth content of a non-first application when switching the third mode to the first mode with the second manner, so as to facilitate reducing power consumption effectively.

The sixth content of the first application may be generated in two ways below. Similar to the first example described above, the sixth content of the first application may be a part of the fifth content of the first application, but different than a first sub-content of the fifth content, the first sub-content is content displayed in the second mode in the region where the fifth content resides. That is, the sixth content of the first application may be partially the same as the fifth content of the first application.

In addition, alternatively, the sixth content of the first application may be generated based on the fifth content of the first application, wherein the sixth content is different than the fifth content. For example, the first application is a shopping application, and the fifth content of the first application in the second mode is commodity information. When the electronic device switches from the second mode to the first mode with the first manner, the displayed sixth content of the first application is bar codes corresponding to the commodity.

Thus it can be seen that, after switching with the first manner, the sixth content may be the same as or completely different than the fifth content. However, the sixth content and the fifth content are relevant no matter the two are the same or not. In contrast, after switching with the second manner, the eighth content and the seventh content are not the same and are irrelevant.

As a fourth example, suppose that in the second mode, the display 70 displays the fifth content of the first application. The processor is configured to further determine a type of the first application, and based on the type of the first application, the processor controls content displayed after a switching.

Specifically, when the sensor detects that the electronic device 1 switches from the second mode to the first mode, if the processor further determines that the type of the first application is a continuous type, such as music player, navigation and other applications, then the processor controls the display 70 to display a sixth content of the first application, the sixth content is a part of the fifth content, and it is different than a first sub-content of the fifth content, the first sub-content is content displayed in the second mode in the region where the fifth content resides. For example, the processor further determines that the type of the first application is a continuous type, then the processor controls to display a simplified interface of the first application, in the simplified interface, a part of the complete content is selected to display. For example, the first application is a music player, after switching from the second mode to the first mode, the first content changes into a part of content selected from among a complete content of playback control buttons (comprising play, pause, fast forward, etc.), a playback progress bar, lyrics, album covers, etc., such as the playback control buttons and the playback progress bar. Alternatively, the processor may also control the display 70 to display a sixth content of the first application, the sixth content is generated based on the first content and is different than the fifth content. For example, if the processor determines that the type of the first application is a continuous type, then the processor may also re-generate a simplified interface of the first application. For example, the first application is a navigation application, after switching from the second mode to the first mode, the first content changes into arrow navigation, the arrow navigation here is completely different than a complete navigation content displayed previously.

On the other hand, if the processor determines that the type of the first application is a non-continuous type, then the processor controls the display 70 to display an eighth content of a non-first application, wherein the eighth content of a non-first application is irrelevant to the fifth content of the first application. For example, if the processor determines that the type of the first application is a non-continuous type, then the processor controls the display 70 to display a screen lock interface.

In this way, when the user changes the second mode to the first mode in a case where the current running application is a continuous-type application, there is a high possibility for the user to desire to further operate the electronic device 1, and when the user changes the second mode to the first mode in a case where the current running application is a non-continuous-type application, there is a high possibility for the user to desire to not operate the electronic device any more, thus the processor is configured to switch the display content from the fifth content of the first application to the sixth content thereof in the case where the current running application is a continuous-type application, wherein the sixth content and the fifth content are relevant, so as to facilitate further operating of the user, and the processor is configured to switch the display content from the fifth content of the first application to the eighth content of a non-first application when switching from the second mode to the first mode in the case where the current running application is a non-continuous-type application, so as to facilitate reducing power consumption effectively.

As a fifth example, suppose that in the second mode, the display 70 displays the fifth content of the first application. Different than the processor is configured to further determine a type of the first application in the fourth example, in the fifth example, the processor is configured to further determine a type of an operation that is being current executed, and based on the type of an operation that is being current executed, the processor controls content displayed after a switching. That is to say, even if the type of the application that is currently running is a continuous-type application, but no continuous-type operation (such as executing music playing, executing a navigation, and other operations) is executed currently, then the displaying is still switched to the eighth content of a non-first application.

Specifically, when the sensor detects that the electronic device 1 switches from the second mode to the first mode, if the processor further determines that the type of the operation is a continuous type, such as executing music playing, executing a navigation and other operations, then the processor controls the display 70 to display a sixth content of the first application, the sixth content is a part of the fifth content, and it is different than a first sub-content of the fifth content, the first sub-content is content displayed in the second mode in the region where the fifth content resides. For example, the processor further determines that the type of the operation is a continuous type, then the processor controls to display a simplified interface of the first application. Alternatively, the processor may also control the display 70 to display a sixth content of the first application, the sixth content is generated based on the fifth content and is different than the fifth content. For example, if the processor determines that the type of the first operation is a continuous type, then the processor may also re-generate a simplified interface of the first application.

On the other hand, if the processor determines that the type of the operation is a non-continuous type, then the processor controls the display 70 to display an eighth content of a non-first application, wherein the eighth content of a non-first application is irrelevant to the fifth content of the first application. For example, if the processor determines that the type of the operation is a non-continuous type, then the processor controls the display 70 to display a screen lock interface.

In this way, when the user changes the second mode to the first mode in the case where the type of an operation that is being currently executed is a continuous type, there is a high possibility for the user to desire to further operate the electronic device 1, and when the user changes the second mode to the first mode in the case where the type of an operation that is being currently executed is a non-continuous type, there is a high possibility for the user to desire to not operate the electronic device any more, thus the processor is configured to switch the fifth content of the first application to the sixth content thereof in the case where the type of an operation that is being current executed is a continuous type, wherein the sixth content and the fifth content are relevant, so as to facilitate further operating of the user, and the processor is configured to switch the fifth content of the first application to the eighth content of a non-first application when switching the second mode to the first mode in the case where the type of an operation that is being currently executed is a non-continuous type, so as to facilitate reducing power consumption effectively.

Figure 15:
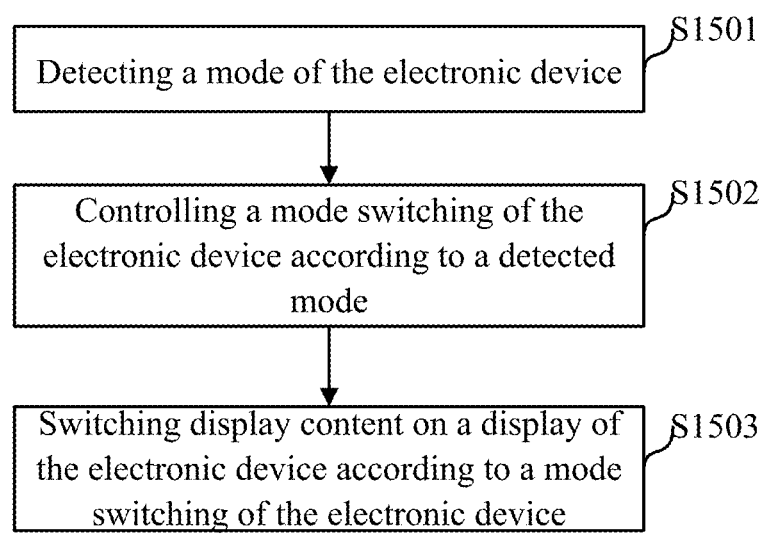
FIG. 15 is a first flowchart illustrating a mode switching method according to an embodiment of the present disclosure.

FIG. 15 is a first flowchart illustrating a mode switching method according to an embodiment of the present disclosure. As shown in FIG. 15, a first example of the mode switching method according to an embodiment of the present disclosure comprises steps provided below.

In step S1501, a mode of the electronic device is detected. As above, the electronic device comprises: a first body having a first end and a second end; a connecting body having a third end and a fourth end, the third end being connected to the second end; a second body having a fifth end and a sixth end, the fifth end being connected to the fourth end, the second body being capable of moving relative to the first body by means of the connecting body; wherein the electronic device has at least a first rotation manner and a second rotation manner: in the first rotation manner, the electronic device is capable of implementing a relative rotation between a first part and a second part with a rotation axis being at a first position of the connecting body, wherein the first part comprises the first body and a first connecting sub-body; the second part comprises the second body and a second connecting sub-body; the first connecting sub-body and the second connecting sub-body are formed by dividing the connecting body at the first position; and in the second rotation manner, the electronic device is capable of implementing a relative rotation between a third part and a fourth part with a rotation axis being at a second position of the connecting body, wherein the third part comprises the first body and a third connecting sub-body; the fourth part comprises the second body and a fourth connecting sub-body; the third connecting sub-body and the fourth connecting sub-body are formed by dividing the connecting body at the second position. The electronic device has a first mode and a second mode, in the first mode, the electronic device rotates in the first rotation manner, and a maximum distance between corresponding points of the first body and the second body is less than a first predetermined threshold; in the second mode, the electronic device rotates in the second rotation manner, and a maximum distance between corresponding points of the first body and the second body is less than a first predetermined threshold.

The mode of the electronic device may be detected by a sensor disposed in the first body and/or the connecting body and/or the second body. Thereafter, the process proceeds to step S1502.

In step S1502, a mode switching of the electronic device is controlled according to a detected mode. Thereafter, the process proceeds to step S1503.

In step S1503, display content on a display of the electronic device is switched according to a mode switching of the electronic device.

Figure 16:
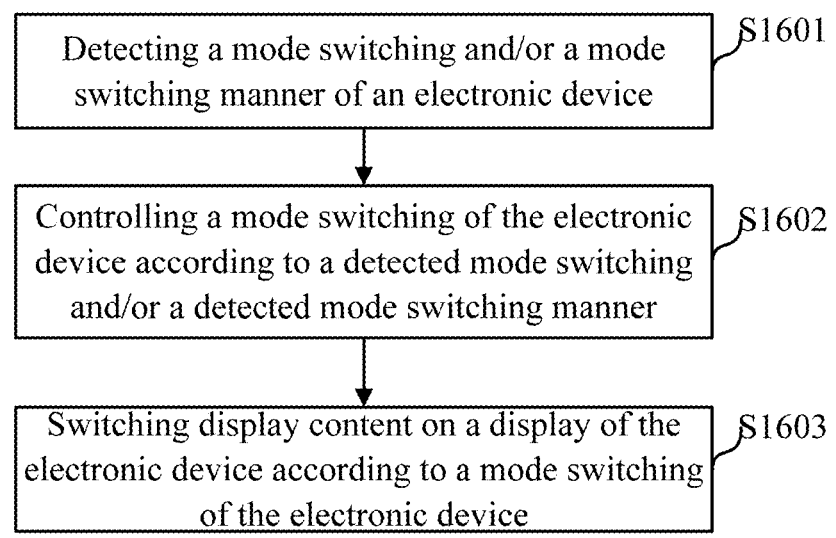
FIG. 16 is a second flowchart illustrating a mode switching method according to an embodiment of the present disclosure.

FIG. 16 is a second flowchart illustrating a mode switching method according to an embodiment of the present disclosure. As shown in FIG. 16, a first example of the mode switching method according to an embodiment of the present disclosure comprises steps provided below.

In step S1601, a mode switching and/or a mode switching manner of an electronic device is detected. As described above, wherein the electronic device comprises: a first body; a connecting body; and a second body connected to the first body through the connecting body; wherein based on the connecting body, the electronic device has at least three modes, in a first mode the first body and the second body have a first relative positional relationship, in a second mode the first body and the second body have a second relative positional relationship, and in a third mode the first body and the second body have a third relative positional relationship, the first relative positional relationship, the second relative positional relationship, and the third positional relationship are different each other; and the electronic device can switch from the second mode to the first mode with a first manner, and switch from the third mode to the first mode with a second manner. The first manner and the second manner are different. The mode of the electronic device may be detected by a sensor disposed in the first body and/or the connecting body and/or the second body. Thereafter, the process proceeds to step S1602.

In step S1602, a mode switching of the electronic device is controlled according to a detected mode switching or a detected mode switching manner. Thereafter, the process proceeds to step S1603.

In step S1603, display content on a display of the electronic device is switched according to a mode switching of the electronic device.

As a first example, suppose that in the second mode, the display 70 displays the third content. When it is detected that the electronic device 1 switches from the second mode to the first mode with the first manner described above, the display 70 is controlled to switch from displaying the third content to displaying a first content.

Because, as described above, area of a first non-covered part of the display in the first mode is smaller than area of a second non-covered part of the display in the second mode, thus, the first content that can be displayed in the first mode certainly is less than the third content that can be displayed in the second mode. Here, the first content is a part of the third content, and the first content is different than a first sub-content of the third content, the first sub-content is a content displayed in the second mode in the region where the first content resides. That is to say, although the first content is a part of the third content, it is not simply cutting the third content as it is, instead, it is a simplified re-combination of respective items in the third content.

On the other hand, suppose in the first mode, the display 70 displays the first content. When it is detected that the electronic device 1 switches from the first mode to the second mode with the first manner described above, the display 70 is controlled to switch from displaying the first content to displaying the third content.

As a second example, suppose in the third mode, the display 70 displays a fourth content, when it is detected that the electronic device 1 switches from the third mode to the first mode with the second manner described above, the display 70 is controlled to switch from displaying the fourth content to displaying the second content.

Different than that the first content and the third content in the first example are relevant, in the second embodiment, the second content is a predetermined content, and the second content is irrelevant to the fourth content.

On the other hand, suppose in the first mode, the display 70 displays the second content. When it is detected that the electronic device 1 switches from the first mode to the third mode with the second manner described above, the display 70 is controlled to switch from displaying the second content to displaying the fourth content.

As a third example, suppose in the second mode, the display 70 displays the fifth content. When it is detected that the electronic device 1 switches from the second mode to the first mode with the first manner described above, the display 70 is controlled to switch from displaying the fifth content of the first application to displaying a sixth content of the first application. And suppose in the third mode, the display 70 displays a seventh content of the first application. In the third example, what should be focused on is that display content will be different when switching to the first mode with different manners (the first manner or the second manner) in a case where the same application is displayed in the second mode and the third mode. Here, it should be noted that, since area of the second non-covered part of the display in the second mode is smaller than area of the third non-covered part of the display in the third mode, thus even if the same application is displayed in the second mode and third mode, content of the same application will be different slightly. Therefore, in the above, the two are differentiated with the fifth content of the first application and the seventh content of the first application. When it is detected that the electronic device 1 switches from the third mode to the first mode with the second manner described above, the display 70 is controlled to switch from displaying the seventh content of the first application to displaying an eighth content of a non-first application, wherein the eighth content of a non-first application is irrelevant to the seventh content of the first application. For example, the eighth content of a non-first application may be a screen lock interface.

As a fourth example, suppose that in the second mode, the display 70 displays the fifth content of the first application. The mode switching method further comprises determining a type of the first application, and content displayed after a switching is controlled based on the type of the first application.

On the other hand, if it is determined that the type of the first application is a non-continuous type, then the display 70 is controlled to display an eighth content of a non-first application, wherein the eighth content of a non-first application is irrelevant to the fifth content of the first application. For example, if it is determined that that the type of the first application is a non-continuous type, then the display 70 is controlled to display a screen lock interface.

As a fifth example, suppose that in the second mode, the display 70 displays the fifth content of the first application. Different than further determining a type of the first application in the fourth example, in the fifth example, the mode switching method further comprises determining a type of an operation that is being current executed, and content displayed after a switching is controlled based on the type of an operation that is being current executed.

On the other hand, if it is determined that the type of the operation is a non-continuous type, then the display 70 is controlled to display an eighth content of a non-first application, wherein the eighth content of a non-first application is irrelevant to the fifth content of the first application. For example, if it is determined that the type of the operation is a non-continuous type, then the display 70 is controlled to display a screen lock interface.

Hereinafter, an electronic device and an information processing method thereof according to a third embodiment of the present disclosure will be further described in detail with reference to FIGS. 17 to 19.

Figure 17:
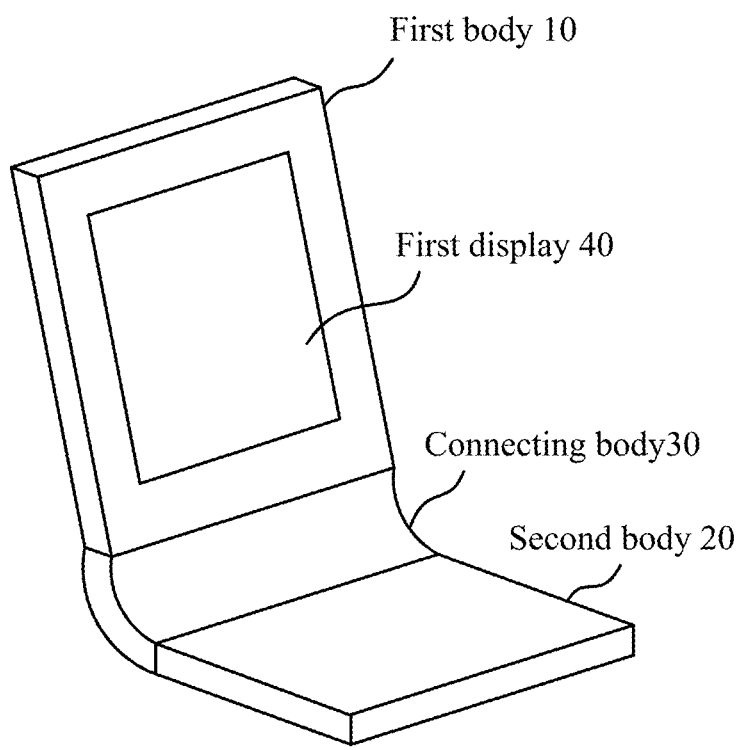
FIG. 17 is a block diagram schematically illustrating structure of the electronic device according to a third embodiment of the present disclosure.

As shown in FIG. 17, the electronic device according to the third embodiment of the present disclosure comprises: a first body 10 having a first surface and a second surface that are opposite; a connecting body 30 having a first surface and a second surface that are opposite; and a second body 20 having a first surface and a second surface that are opposite, and being connected to the first body through the connecting body; wherein the electronic device has a first outer surface and a second outer surface, the first outer surface comprises a first surface of the first body, a first surface of the connecting body, and a first surface of the second body, the second outer surface comprises a second surface of the first body, a second surface of the connecting body, and a second surface of the second body.

In addition, as shown in FIG. 17, the electronic device according to the third embodiment of the present disclosure further comprises: a first display 40 disposed at least in a part of region of the first outer surface of the electronic device, shown with solid line in FIG. 17.

Specifically, in the first example, the first display may be disposed in the entire first outer surface, i.e., across three parts: the first surface of the first body, the first surface of the connecting body, and the first surface of the second body. In a second example, the first display may be disposed in a part of region of the first outer surface, for example, across at least a part of the first surface of the first body and the first surface of the connecting body. Of course, as will be appreciated by those skilled in the art, the first display may be disposed only on the first surface of the first body.

It should be noted that, in a case where the first display is disposed across two bodies or three bodies, in the first example, the first display may comprise corresponding two or three display screens, respective display screens are arranged adjacent to each other closely. In the second example, the first display may comprise only a whole piece of display screen.

In addition, the electronic device in this embodiment of the present disclosure has at least two modes, hereinafter described as a second mode and a third mode, respectively. In the second mode, a second region of the first display can be perceived by a viewer. In the third mode, a third region of the first display can be perceived by a viewer. The third region is larger than the second region.

Specifically, a surface composed by the first surface of the first body and the first surface of the connecting body in the second mode is covered by the second body, and a second non-covered part of the first body corresponds to the second region. That is to say, the second region that can be perceived by the viewer is an exposed region of the first display in this case. In the third mode, the first surface of the first body is not covered. An angle between the first body and the second body is larger than a threshold, the threshold may be set at will by those skilled in the art as needed, the present disclosure makes no limitation thereto. As an example, the threshold is larger than 120 degrees. As another example, the threshold is larger than 150 degrees. That is to say, in the third mode, an obtuse angle is formed between the first body and the second body, it even is close to 180 degrees, that is, the plane formed by the first body and the second body is approximately flat. In addition, the first outer surface corresponds to the third region. Likewise, the third region can be perceived by the viewer is an exposed region of the first display in this case.

In addition, the electronic device may further have a first mode. In the first mode, a first region of the first display can be perceived by the viewer, and a surface composed by the first surface of the first body and the first surface of the connecting body is covered by the second body, and a first non-covered part of the first body corresponds to the first region. The display control unit described below is for controlling to display a first interface in the first region in the first mode.

In addition, the first mode and the second mode can be switched by a manner of maintaining a distance between the sixth end and the first surface as smaller than the first predetermined threshold.

In addition, as shown in FIG. 17, the electronic device in this embodiment of the present disclosure further comprises a display control unit (not shown). The display control unit may be disposed in any of the first body, the second body, and the connecting body. Specifically, the display control unit is for controlling to display a third interface in a third region in the third mode. The third interface comprises at least a first sub-interface and a second sub-interface. In addition, the display control unit is further for controlling to display a second interface in the second region in the second mode, the second interface comprises only a third sub-interface. In other words, different than the third interface that comprises at least two sub-interfaces, the second interface is composed by a single sub-interface. The second interface and the third interface will be described in detail later with reference to specific examples.

In addition, the electronic device in this embodiment of the present disclosure may further comprise a first sensor (not shown). The first sensor is for sensing a parameter indicating a mode of the electronic device, so as to generate a corresponding trigger signal. Specifically, in the first example, the first sensor comprises a photosensitive unit, the photosensitive unit comprises a light detecting array disposed corresponding to a light emitting array of the display, and is configured to determine an exposed region of the display according to a region that satisfies a predetermined luminance threshold in the light detecting array, as a parameter indicating a mode of the electronic device. In a second example, the first sensor comprises a bending detecting unit disposed in the connecting body and configured to determine a bending state of the connecting body as a parameter indicating a mode of the electronic device.

Accordingly, in response to a trigger signal generated by the first sensor and indicating that the electronic device switches from the second mode to the third mode, the display control unit switches from the second interface to the third interface, or in response to a trigger signal indicating that the electronic device switches from the third mode to the second mode, the display control unit switches from the third interface to the second interface.

Different scenarios of the electronic device in the third embodiment of the present disclosure will be described in detail below.

In a first scenario, the electronic device is in the second mode, and the second interface is displayed in the second region of the first display. The second interface is a chat interface of a chat application. When the first sensor senses that the electronic device changes from the second mode to the third mode, the display control unit correspondingly switches the second interface to the third interface. The third interface is another interface of the chat application different than the chat interface, such as a sharing interface that displays a map and shares location. The sharing interface may have a first sub-interface and a second sub-interface. The first sub-interface is, for example, an operation region to join in and quit from sharing. The second sub-interface is, for example, a shared region where shared content is displayed. That is to say, in the first scenario, in the second mode, a first invoked interface of a certain application is displayed. When the electronic device switches from the second mode to the third mode, and a second invoked interface of the same application different than the first invoked interface is displayed. Accordingly, the user can conveniently switch between multiple interfaces of an application, make full use of various functions of the application, which improves user experience.

In a second scenario, the electronic device is in the second mode, and the second interface is displayed in the second region of the first display. The second interface is a chat interface of a chat application. When the first sensor senses that the electronic device changes from the second mode to the third mode, the display control unit correspondingly switches the second interface to the third interface. The third interface is another interface of the chat application, such as an extended chat interface. The extended chat interface may have a first sub-interface and a second sub-interface. The first sub-interface, for example, corresponds to a chat interface in the second mode. The second sub-interface is, for example, a shared interface for sharing. That is, in the second scenario, in the second mode, a first invoked interface of a certain application is displayed. When the electronic device switches from the second mode to the third mode, a second invoked interface of the same application is displayed, and the first sub-interface in the second invoked interface corresponds to the first invoked interface. Accordingly, the user can conveniently switch between multiple interfaces of an application, the interfaces before and after the switching have a functional continuity, which improves user experience.

In a third scenario, the electronic device is in the second mode, and the second interface is displayed in the second region of the first display. The second interface is a chat interface of a chat application. When the first sensor senses that the electronic device changes from the second mode to the third mode, the display control unit correspondingly switches the second interface to the third interface. The third interface is an interface of another application different than the chat application, such as an interface of a navigation application. The interface of the navigation application may have a first sub-interface and a second sub-interface. The first sub-interface is, for example, a real view navigation interface. The second sub-interface is, for example, a planar map navigation interface. That is to say, in the third scenario, in the second mode, a first invoked interface of a certain application is displayed. When the electronic device switches from the second mode to the third mode, and a second invoked interface of a different application is displayed. Accordingly, the user can conveniently switch between multiple applications without exiting an application, which improves user experience.

In a fourth scenario, the electronic device is in the second mode, and the second interface is displayed in the second region of the first display. The second interface is a chat interface of a chat application. When the first sensor senses that the electronic device changes from the second mode to the third mode, the display control unit correspondingly switches the second interface to the third interface. The third interface has a first sub-interface and a second sub-interface. The first sub-interface is, for example, an interface of another application different than the chat application, such as a navigation interface. The second sub-interface is, for example, an interface of yet another application different than the chat application, such as memo interface. That is, in the fourth scenario, in the second mode, a first invoked interface of a certain application is displayed. When the electronic device switches from the second mode to the third mode, and a second invoked interface comprising application interfaces of two applications different than the aforesaid application is displayed. Accordingly, the user can conveniently switch between multiple applications without exiting an application, which improves user experience.

It should be noted that, in the above, the aforesaid several scenarios are described with switching from the second mode to the third mode as an example. As will be appreciated by those skilled in the art, the above scenarios may be also applied to the case of switching from the third mode to the second mode.

In addition, should be noted that, in the various scenarios described above, layout, display direction, and size of respective interfaces may be designed in various ways.

In the first example, layout between the first sub-interface and the second sub-interface may be designed as follows. Specifically, when the electronic device switches from the second mode to the third mode, the display control unit can control to display the first sub-interface in the second region to which second mode corresponds, and display the second sub-interface in the region other than the second region in the third region. This is especially advantageous to the second scenario described above. That is to say, not only the interfaces before and after the switching have a functional continuity, but also the interfaces before and after the switching have a displaying continuity, which further improves user experience.

In the second example, a display direction of the display interface may be determined with reference to a mode of the electronic device. That is to say, even if the electronic device comprises a sensor like a gravity sensor and has the function of adaptively changing a display direction, it is also possible to determine whether to enable this function according to a mode of the electronic device. Specifically, in this example, the electronic device may further comprise a second sensor configured to sense a spatial movement parameter of the electronic device. The second sensor is, for example, a gravity sensor, an acceleration sensor and other sensors. The spatial movement parameter is, for example, an acceleration of the electronic device and other parameters. When the electronic device is in the second mode, the display control unit does not respond to the spatial movement parameter to change the direction of the second interface. On the other hand, when the electronic device is in the third mode, the display control unit responds to the spatial movement parameter to change the display direction of the third interface. That is to say, in this example, when the electronic device is in the second mode, the display direction of the electronic device is "locked", and it may also be understood as that the function that the electronic device adaptively changes the display direction according to the spatial movement parameter is disabled. When the electronic device is in the third mode, the display direction of the electronic device is not "locked", and it may also be understood as that the function that the electronic device adaptively changes the display direction according to the spatial movement parameter is enabled.

In a third example, on the basis of the second example described above, the electronic device may further determine layout of the first sub-interface and the second sub-interface in the third mode according to the spatial movement parameter. Specifically, in this example, in the third mode, the processor, in response to a first spatial movement parameter indicating that the electronic device is vertical, displays the first sub-interface and the second sub-interface as vertically arranged; the processor, in response to a first spatial movement parameter indicating that the electronic device is horizontal, displays the first sub-interface and the second sub-interface as horizontally arranged. Accordingly, layout of the first sub-interface and the second sub-interface in the third mode can be controlled according to the spatial movement parameter of the electronic device, to make it better meet the user's habits, which improves user experience.

In addition, the electronic device further comprises: a first input unit disposed at least in a second surface of the second part; a second display disposed at least in a second surface of the second body; wherein the first input unit and second display disposed at least in a second surface of the second part are set a stacked manner. In the second mode, a character array (e.g., a virtual keyboard) is displayed on the second display, each position of the character array indicates a corresponding input character when the user performs a touch input, the processor determines a corresponding character in response to a click input operation on the first input unit, and the character is displayed in the second interface. Accordingly, in the second mode, the user can conveniently perform a character input operation in a case where the display direction of the electronic device is "locked", thereby increasing input efficiency, which improves user experience.

Figure 18A:
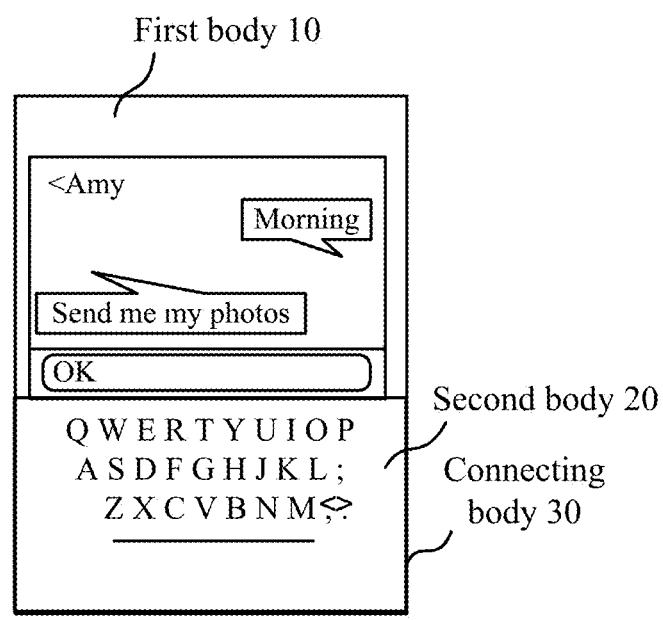
FIGS. 18A and 18B are schematic diagrams illustrating displaying of the electronic device according to the third embodiment of the present disclosure in different modes.
Figure 18B:
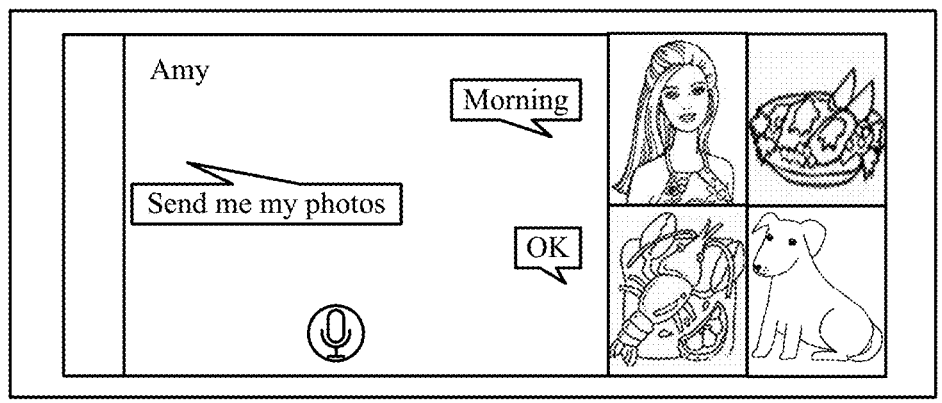

FIGS. 18A and 18B are schematic diagrams illustrating displaying of the electronic device according to the third embodiment of the present disclosure.

As shown in FIG. 18A, the electronic device is in a second mode. In the second mode, a surface composed by the first surface of the first body and the first surface of the connecting body in the second mode is covered by the second body, and a second non-covered part of the first body corresponds to the second region. A chat interface of a chat application is displayed in the second region.

In addition, in the case where a second display is also disposed in the second surface of the second body to form a touch display, as shown in FIG. 18B, a character array (e.g., a virtual keyboard) is displayed on the touch display, each position of the character array indicates a corresponding input character when the user performs a touch input. In this case, if a click input operation on the virtual keyboard is received through the touch display, then the processor can determine a corresponding character, and the character is displayed in the first display. That is to say, in the second mode, the user can perform an input operation like character editing.

In this case, if the first sensor senses that the electronic device changes from the second mode to the third mode and generates a corresponding trigger signal, then the display control unit switches the second interface to the third interface in response to the trigger signal, as shown in FIG. 18B. In FIG. 18B, the electronic device not only changes from the second mode to the third mode, but also changes from the vertical direction to the horizontal direction. Thus, the display interface that comprises the first sub-interface and the second sub-interface is displayed in the third region, and the third region is displayed horizontally, wherein the first sub-interface and the second sub-interface are displayed as horizontally arranged.

The electronic device according to the third embodiment of the present disclosure is described above with reference to FIGS. 17 and 18. The electronic device comprises the first body and the second body connected through the connecting body, a display is disposed on the first surface of the first body, and a different region of the display is perceived by the viewer in a different mode of the electronic device, thereby a new product form comprising at least two modes is provided, which thereby enriches user selection, improves user experience.

Further, in the electronic device according to the third embodiment of the present disclosure, a corresponding interface can be displayed according to a mode which the electronic device is in, so that display content of the electronic device adapts to its mode, which thereby facilitates user viewing and using, increases operating efficiency, and further improves user experience.

Hereinafter, a display processing method according to the third embodiment of the present disclosure will be described with reference to FIG. 19. The display processing method according to the third embodiment of the present disclosure may be applied to an electronic device. The electronic device comprises: a first body 10 having a first surface and a second surface that are opposite; a connecting body 30 having a first surface and a second surface that are opposite; and a second body 20 having a first surface and a second surface that are opposite, and being connected to the first body through the connecting body; wherein the electronic device has a first outer surface and a second outer surface, the first outer surface comprises a first surface of the first body, a first surface of the connecting body, and a first surface of the second body, the second outer surface comprises a second surface of the first body, a second surface of the connecting body, and a second surface of the second body; a first display is disposed at least in a part of region of the first outer surface of the electronic device, the electronic device has at least two modes, a second mode and a third mode, respectively. In the second mode, a second region of the first display can be perceived by a viewer. In the third mode, a third region of the first display can be perceived by a viewer. The third region is larger than the second region.

Figure 19:
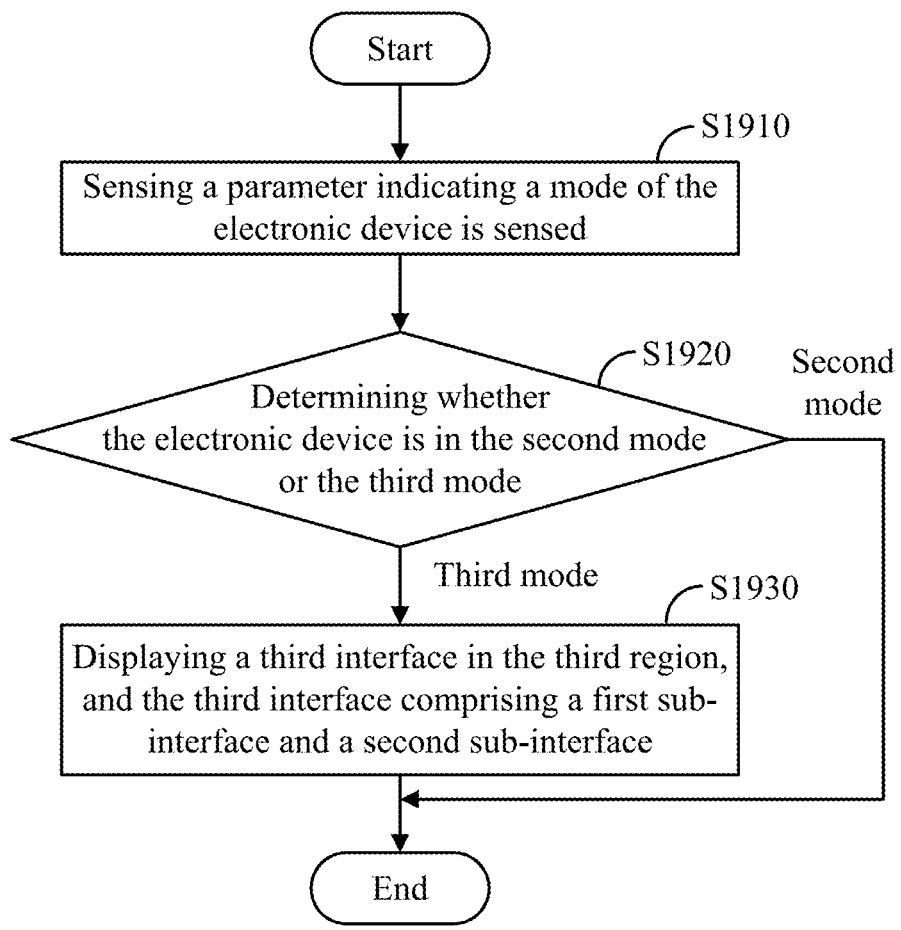
FIG. 19 is a flowchart illustrating main steps of an information processing method according to the third embodiment of the present disclosure.

As shown in FIG. 19, first, in step S1910, a parameter indicating a mode of the electronic device is sensed.

Next, in step S1920, it is determined whether the electronic device is in the second mode or the third mode based on the parameter.

When it is determined that the electronic device is in the third mode, it proceeds to step S1930, a third interface is displayed in the third region, the third interface has a first sub-interface and a second sub-interface.

In an embodiment, the display processing method further comprises: when it is determined that the electronic device is in the second mode, a second interface is displayed in the second region, the second interface has only a third sub-interface; a first trigger signal indicating that the electronic device changes from the second mode to the third mode is received; in response to the first trigger signal, a first display switching signal is generated; and in response to the first display switching signal, a second interface is displayed on the second region, the second interface comprises only the third sub-interface.

In another embodiment, the display processing method further comprises: when it is determined that the electronic device is in the third mode, a third interface is displayed; a second trigger signal indicating that the electronic device changes from the third mode to the second mode is received; in response to the second trigger signal, a second display switching signal is generated; and in response to the second display switching signal, a second interface is displayed on the second region, the second interface comprises only the third sub-interface.

In another embodiment, when it is determined that the electronic device is in the second mode, the second interface is displayed in the second region, the second interface comprises only the third sub-interface, the display processing method further comprises: a spatial movement parameter of the electronic device is sensed; in the second mode, the direction of the second interface is not changed in response to the spatial movement parameter; in the third mode, the direction of the second interface is changed in response to the spatial movement parameter.

In another embodiment, the electronic further has a first mode. In the first mode, a first region of the first display can be perceived by the viewer, and a surface composed by the first surface of the first body and the first surface of the connecting body is covered by the second body, and a second non-covered part of the first body corresponds to the first region. The display processing method further comprises: it is determined the electronic device is in the first mode, the second mode, or the third mode based on the aforesaid parameter; and when the electronic device is in the first mode, the first interface is controlled to be displayed in the first region.

The display processing method according to the third embodiment of the present disclosure is described above with reference to FIG. 19. In the display processing method according to the third embodiment of the present disclosure, a corresponding interface can be displayed according to a mode which the electronic device is in, so that display content of the electronic device adapts to its mode, which thereby facilitates user viewing and using, increases operating efficiency, and further improves user experience.

Hereinafter, the electronic device according to a fourth embodiment of the present disclosure of an information processing method thereof will be described with reference to FIGS. 20 to 22.

Figure 20:
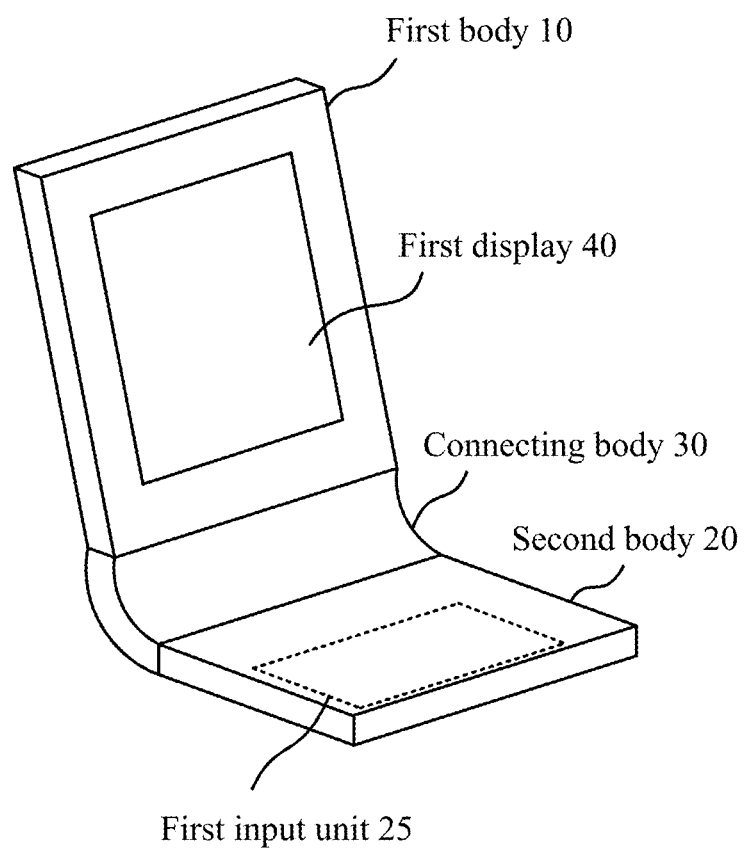
FIG. 20 is a block diagram schematically illustrating structure of the electronic device according to a fourth embodiment of the present disclosure.

FIG. 20 is a block diagram schematically illustrating structure of the electronic device according to a fourth embodiment of the present disclosure. As shown in FIG. 20, the electronic device according to the fourth embodiment of the present disclosure comprises: a first body 10 having a first surface and a second surface that are opposite; a connecting body 30; and a second body 20 having a first surface and a second surface that are opposite, and being connected to the first body through the connecting body; a first display 40 disposed at least in the first surface of the first body; a first input unit 25 disposed at least in the second surface of the second body; wherein the electronic device has a first outer surface and a second outer surface, the first outer surface comprises the first surface of the first body and the first surface of the second body, the second outer surface comprises the second surface of the first body and the second surface of the second body.

Optionally, the first body has a first end and a second end; the connecting body has a third end and a fourth end, the third end is connected to the second end; the second body has a fifth end and a sixth end, the fifth end is connected to the fourth end, the second body is at least capable of rotating relative to the first body based on the connecting body.

In addition, the electronic device may at least have a first mode, in which a first surface of the first body is covered by the connecting body and the second body, and a second mode, in which a surface composed by the first surface of the first body and a first surface of the connecting body is covered by the second body.

In addition, the electronic device may further have a third mode. In the third mode, the first surface of the first body is not covered. An angle between the first body and the second body is larger than a threshold, which may be set at will by those skilled in the art as needed, the present disclosure makes no limitation thereto. As an example, the threshold is larger than 120 degrees. As another example, the threshold is larger than 150 degrees. That is to say, in the third mode, an obtuse angle is formed between the first body and the second body, it even is close to 180 degrees, that is, the plane formed by the first body and the second body is approximately flat.

In addition, as shown in FIG. 20, the electronic device according to the fourth embodiment of the present disclosure further comprises: a first display 40 disposed at least in the first surface of the first body, shown with solid line in FIG. 20. The first display is disposed at least in the first surface of the first body. It should be noted that, although in FIG. 20, the first display is shown as disposed in a part of region of the first surface of the first body, in fact, it may be disposed in the entire region of the first surface of the first body. In addition, in the first example, the first display may be disposed in only the first surface of the first body. In the second example, as described above, the connecting body also has a first body and a second body that are opposite to each other, and the first display may be disposed at least in a part of the first surface of the first body and the first surface of the connecting body. In other words, the first display may be disposed across two bodies: the first body and the connecting body. In the third example, the first display may be disposed in the first surface of the first body, the first surface of the connecting body, and the first surface of the second body. In other words, the first display may be disposed across three bodies: the first body, the connecting body, and the second body.

It should be noted that, in the case where the first display is disposed across two bodies or three bodies, in the first example, the first display may comprise corresponding two or three display screens, respective display screens are arranged adjacent to each other closely. In the second example, the first display may comprise only a whole piece of display screen.

In addition, as shown in FIG. 20, the electronic device according to the fourth embodiment of the present disclosure further comprises: a first input unit 25 disposed at least in the second surface of the second body, shown with dotted line in FIG. 20. It should be noted that, although in FIG. 20, the first input unit is shown as disposed in a part of region of the second surface of the second body, in fact, it may be disposed in the entire region of second surface of the second body. The first input unit may be for example a touch control unit, like a touch panel. Specifically, in the first example, the first input unit may be disposed in only second surface of the second body. In the second example, the first input unit may be disposed at least in a part of the second surface of the second body and the second surface of the connecting body. In other words, the first input unit may be disposed across two bodies: the first body and the connecting body. In the third example, the first input unit may be disposed in the second surface of the first body, the second surface of the connecting body, and the second surface of the second body. In other words, the first input unit may be disposed across three bodies: the first body, the connecting body, and the second body.

Likewise, it should be noted that, in the case where the first input unit is disposed across two bodies or three bodies, the first input unit may comprise corresponding two or three touch panels, or the first input unit may comprise only a whole piece of touch panel.

In addition, optionally, the electronic device may further comprise: a second display disposed at least in the second surface of the second body. Similarly, the second display may be disposed only in the second surface of the second body, or disposed in the second surface of the first body and the second surface of the first connecting body, or disposed in second body of the first body, the second surface of the connecting body, and the second surface of the second body.

It should be noted that, no matter it is disposed in which way, the first input unit and the second display disposed on the second surface of the body may be set in a stacked manner. That is to say, in the case that the first input unit is a touch control unit, it is possible to set a touch display on the second surface of the second body.

In addition, optionally, the electronic device may further comprise: a second input unit disposed at least in the first surface of the first body. Similarly, the second input unit may be disposed only in the first surface of the first body, or disposed in the first surface of the first body and the first surface of the connecting body, or disposed in first surface of the first body, the first surface of the connecting body, and the first surface of the second body.

Also, it should be noted that, no matter it is disposed in which way, the second input unit and the first display disposed on the first surface of the body may be set in a stacked manner. That is to say, in the case that the second input unit is a touch control unit, it is possible to set a touch display on the first surface of the first body. And it should be noted that, when the second input unit and the first display are set in a stacked manner, the first display will not affect acquisition and input of the second input unit, the second input unit will not affect the first display being perceived by the viewer.

In addition, in the fourth embodiment of the present disclosure, as described above, the electronic device may have at least a first mode and a second mode. In a first mode the first body and the second body have a first relative positional relationship. In a second mode the first body and the second body have a second relative positional relationship. In the first mode, a first covered part of the first display and the first input unit face the same direction. In the second mode, a second non-covered part of the first display and the first input unit face the same direction. Area of a first non-covered part of the display is different than area of a second non-covered part of the display. For example, area of the first non-covered part is smaller than area of the second non-covered.

In addition, the electronic device according to the fourth embodiment of the present disclosure may further comprise a processor. Accordingly, in the first mode, the processor can respond to an input of the first input unit through an instruction in a first instruction set. In the second mode, the processor can respond to an input of the first input unit through an instruction in a second instruction set. The first instruction set and the second instruction set are at least partially different.

Specifically, the processor may comprise a display control unit configured to control a change of display content on the first display in response to an input to first input unit.

More specifically, in the first mode, the display control unit may change display content on the first display in response to a slide input operation on the first input unit. On the other hand, in the second mode, the display control unit can determine a corresponding character in response to a click input operation on the first input unit, and display the character on the first display.

In addition, the electronic device according to the fourth embodiment of the present disclosure may further comprise a first sensor. The first sensor is configured to sense a parameter indicating a mode of the electronic device and generate a corresponding trigger signal. The processor responds to an input on the first input unit through an instruction in a second instruction set in response to a first trigger signal indicating that the electronic device switches from the first mode to the second mode; and responds to an input on the first input unit through an instruction in a first instruction set in response to a second trigger signal indicating that the electronic device switches from the second mode to the first mode.

Specifically, in the first example, the first sensor may comprise a photosensitive unit, the photosensitive unit comprises a light detecting array disposed corresponding to a light emitting array of the display, and is configured to determine an exposed region of the display according to a region that satisfies a predetermined luminance threshold in the light detecting array, as a parameter indicating a mode of the electronic device.

In a second example, the first sensor may comprise a bending detecting unit disposed in the connecting body and configured to determine a bending state of the connecting body as a parameter indicating a mode of the electronic device.

Figure 21A:
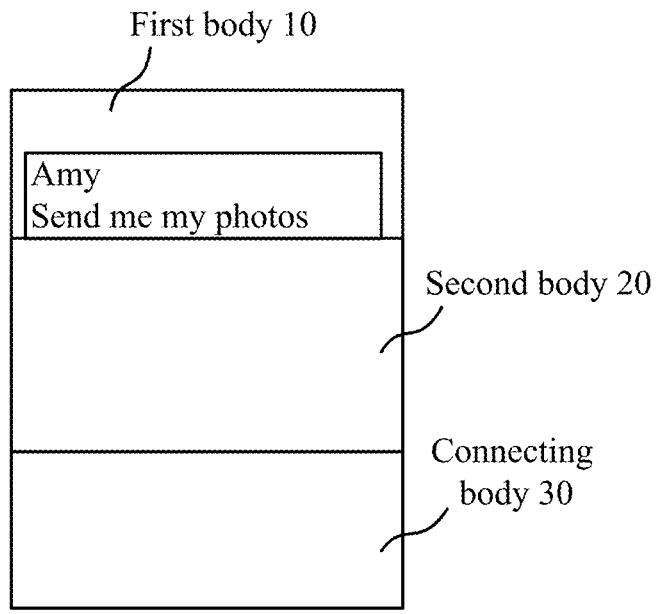
FIGS. 21A and 21B are schematic diagrams illustrating displaying of the electronic device according to the fourth embodiment of the present disclosure in different modes.
Figure 21B:
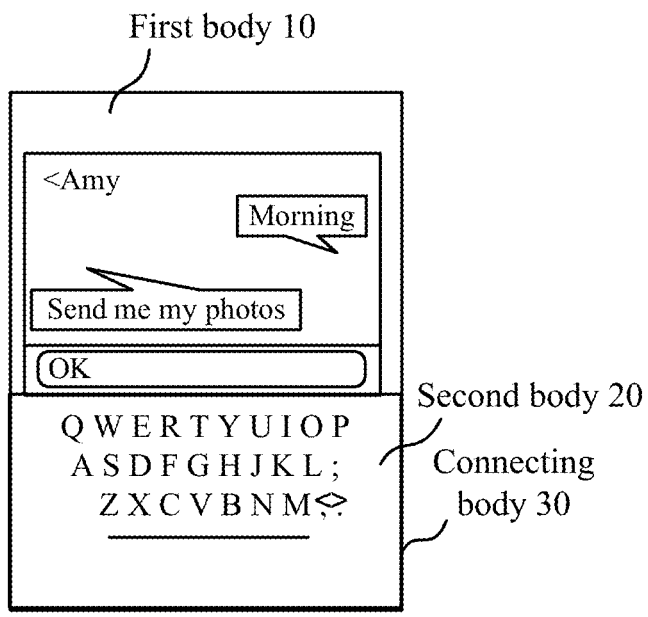

FIGS. 21A and 21B are schematic diagrams illustrating operating manners and display content of the electronic device according to the fourth embodiment of the present disclosure in different modes.

As shown in FIG. 21A, the electronic device is in a first mode. In the first mode, a first non-covered part of the first display and the first input unit face the same direction. And the first non-covered part has relatively small area. In this first mode, a display content is displayed on the first display. In this case, an operation of a first manner (such as a slide input operation) is received through the first input unit, then the display control unit correspondingly changes the displaying of the first display through an instruction in the first instruction set in response to the slide input operation. For example, when the display content is a first notifying message, the display control unit can switch the first notifying message to a second notifying message in response to the slide input operation.

In addition, optionally, in the first mode shown in FIG. 21A, if an operation of a second manner (such as a click input operation) different than the first manner is received through the first input unit, then the processor may make no processing.

As shown in FIG. 21B, the electronic device is in the second mode. In the second mode, a second non-covered part of the first display and the first input unit face the same direction. And the second non-covered part has relatively large area. In this second mode, display content displayed on the first display is more than that displayed on the first display in the first mode as shown in FIG. 21A, information amount is larger. In this case, if an operation of a second manner (such as a click input operation) is received through the first input unit, then the processor correspondingly changes the displaying of the second display through an instruction in the second instruction set in response to the click input operation.

In addition, in the case where a second display is also disposed in the second surface of the second body to form a touch display, a character array may be displayed on the touch display, each position of the character array indicates a corresponding input character when the user performs a touch input. Specifically, in FIG. 21B, illustration is made with the character array being a virtual keyboard as an example. In this case, if a click input operation on the virtual keyboard is received through the touch display, then the processor can determine a corresponding character, and the character is displayed in the first display. That is to say, in the second mode, the user can perform an input operation like character editing.

In addition, optionally, in the second mode shown in FIG. 21B, if an operation of a first manner (such as a slide input operation) different than the second manner is received through the first input unit, since the second instruction set may probably comprise no instruction corresponding to the operation of the first manner, then the processor may make no processing.

As will be appreciated by those skilled in the art, although description is provided above with operations of two different manners, slide input operation and click input operation, as examples, the present disclosure is not limited thereto. Instead, in the electronic device according to the fourth embodiment of the present disclosure, the first input unit can receive different manners of input operations in different modes, and the processor can respond through instructions in different instruction sets. In addition, in the case where the first input unit and the optional second display form a touch display in a stacked way, in the first mode, the second display may be disabled, so that the touch display serves as only a touch panel, thus saving power of the electronic device. In the second mode, the second display can display content corresponding to an operation manner of the second mode, such as a virtual keyboard etc., so that it assists in user input. That is to say, the touch display supports a different function in a different mode.

Specifically, in the first example, as described above, the first sensor senses a parameter indicating a mode of the electronic device. As long as the first sensor senses that the mode of the electronic device changes, the processor accordingly changes a responding manner to an input of the first input unit. For example, as long as the first sensor senses that the electronic device switches to the second mode, the processor accordingly changes a responding manner to an input of the first input unit, for example, it responds through an instruction in the second instruction set. Further, if the second display is disabled in the former mode, the processor may trigger to enable the second display.

In the second example, as described above, the electronic device may have the first mode, the second mode, and the third mode. When the first sensor senses that the mode of the electronic device changes, the processor determines whether the mode before change is a specified mode. Only when the electronic device changes from a specified mode to another mode, the processor accordingly changes a responding manner to an input of the first input unit. For example, only when the electronic device switches from the first mode to the second mode, the processor accordingly changes a responding manner to an input of the first input unit, for example, it responds through an instruction in the second instruction set. Further, if the second display is disabled in the former mode, the processor may trigger to enable the second display.

In the third example, when the first sensor senses that the mode of the electronic device changes, the processor further determines whether a specific application is running on the electronic device in the mode before change occurs. Only when a specific application is running on the electronic device in the mode before change occurs, the processor accordingly changes a responding manner to an input of the first input unit. For example, only when the electronic device switches from a certain mode to the second mode and an application that supports character input is running in the mode before change occurs, the processor accordingly changes a responding manner to an input of the first input unit, for example, it responds through an instruction in the second instruction set. Further, if the second display is disabled in the former mode, the processor may trigger to enable the second display.

Accordingly, the electronic device according to the fourth embodiment of the present disclosure comprises the first body and the second body connected through the connecting body, a display is disposed on the first surface of the first body, and an input unit is disposed in the second surface of the second body, thereby a new product form comprising a display and input unit is provided, which thereby enriches user selection, improves user experience.

Further, in the electronic device according to the fourth embodiment of the present disclosure, when an input signal is received, response can be made through instructions in different instruction sets according to a current mode of the electronic device, so that the operating manner of the electronic device having multiple modes adapts to its mode, so that the user can control the electronic device with a simple operation that meet the user's cognition habits, which thereby increases operating efficiency, and further improves user experience.

Hereinafter, an information processing method according to the fourth embodiment of the present disclosure will be described with reference to FIG. 20.

The display processing method according to the fourth embodiment of the present disclosure may be applied to an electronic device. The electronic device comprises: a first body having a first surface and a second surface that are opposite; a connecting body; and a second body having a first surface and a second surface that are opposite, and being connected to the first body through the connecting body; a first display disposed at least in the first surface of the first body; a first input unit disposed at least in the second surface of the second body; wherein the electronic device has a first outer surface and a second outer surface, the first outer surface comprises the first surface of the first body and the first surface of the second body, the second outer surface comprises the second surface of the first body and the second surface of the second body.

In addition, the electronic device may at least have a first mode and a second mode. In the first mode, the first body and the second body have a first relative positional relationship. In the second mode, the first body and the second body have a second relative positional relationship.

Figure 22:
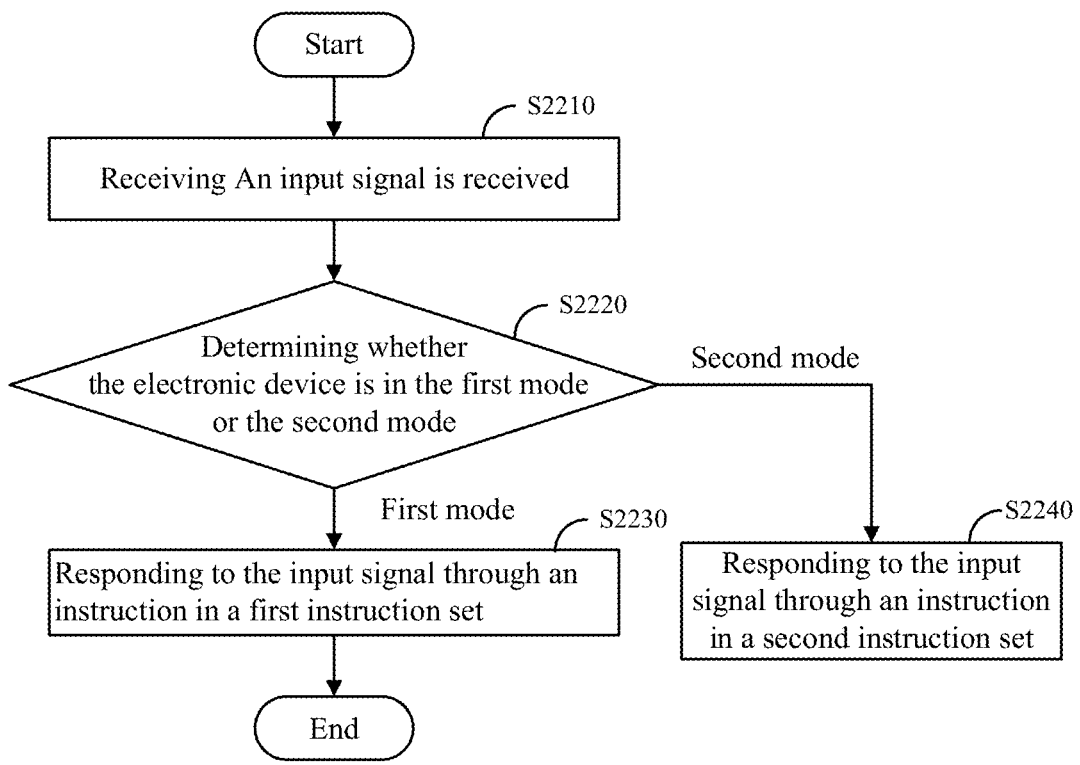
FIG. 22 is a flowchart illustrating main steps of an information processing method according to the fourth embodiment of the present disclosure.

As shown in FIG. 22, first, in step S2210, an input signal is received. Next, in step S2220, it is determined whether the electronic device is in the first mode or the second mode based on the parameter. When the electronic device is in the first mode, it proceeds to step S2230, a response is made to the input signal through an instruction in a first instruction set; when the electronic device is in the second mode, it proceeds to step S2240, a response is made to the input signal through an instruction in a second instruction set. The first instruction set and the second instruction set are at least partially different.

In one embodiment, specifically, in the first mode, in response to an input signal indicating a slide input operation, display content on the first display is changed. In the second mode, in response to an input signal indicating a click input operation, a corresponding character is determined, and the character is displayed on the first display.

In another embodiment, when it is determined that the electronic device is in the first mode, a parameter indicating a mode of the electronic device is detected to generate a corresponding trigger signal. Response to the input signal is made through an instruction in a second instruction set in response to a first trigger signal indicating that the electronic device switches from the first mode to the second mode.

In another embodiment, when it is determined that the electronic device is in the second mode, a parameter indicating a mode of the electronic device is detected to generate a corresponding trigger signal. Response to the input signal is made with an instruction in a first instruction set in response to a second trigger signal indicating that the electronic device switches from the second mode to the first mode.

Specific operations of respective steps of the information processing method have already been described in the detail description for the electronic device with reference to FIGS. 20 and 21, repetition is needless.

Further, in the information processing method according to the fourth embodiment of the present disclosure, when an input signal is received, a response can be made with instructions in different instruction sets according to a current mode of the electronic device, so that the operating manner of the electronic device having multiple modes adapts to its mode, so that the user can control the electronic device with a simple operation that meet the user's cognition habits, which thereby increases operating efficiency, and further improves user experience.

Figure 23:
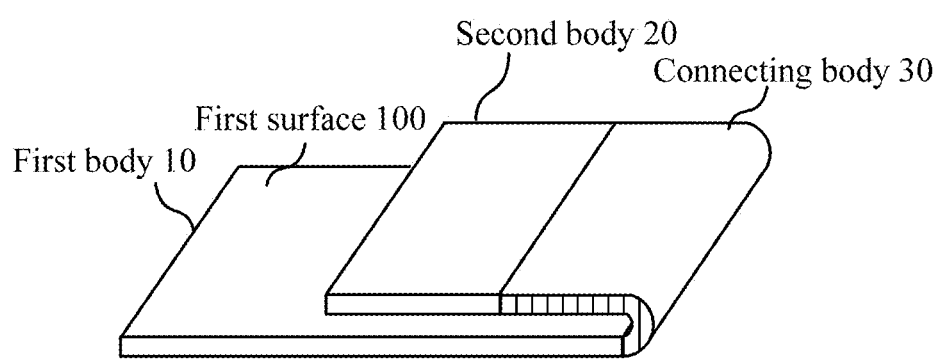
FIG. 23 is a perspective view of the first mode of electronic device according to a fifth embodiment of the present disclosure.

FIG. 23 is a perspective view of the first mode of electronic device according to a fifth embodiment of the present disclosure. As shown in FIG. 23, in the first mode, the first surface 100 of the first body 10 is covered by the connecting body and the second body 20.

Figure 24:
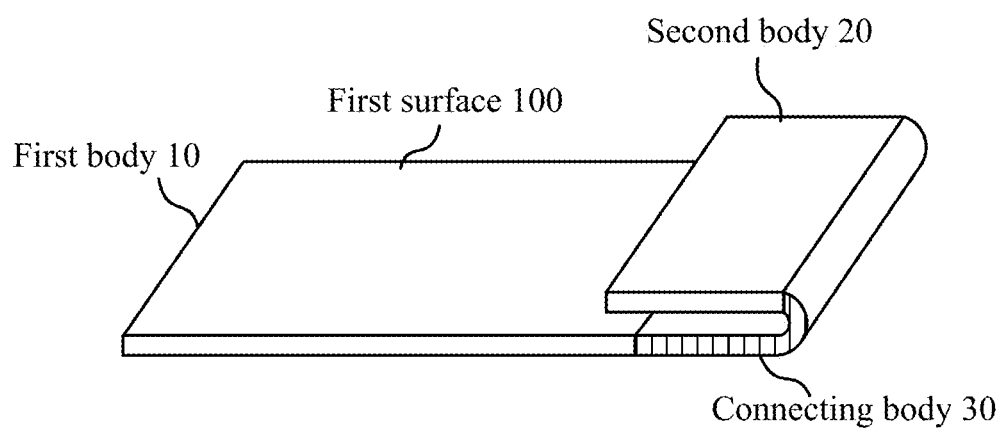
FIG. 24 is a perspective view of the second mode of electronic device according to the fifth embodiment of the present disclosure.

FIG. 24 is a perspective view of the second mode of electronic device according to the fifth embodiment of the present disclosure. As shown in FIG. 24, in the second mode, a surface composed by the first surface 100 of the first body 10 and the first surface 300 of the connecting body 30 is covered by the second body 20.

Figure 25:
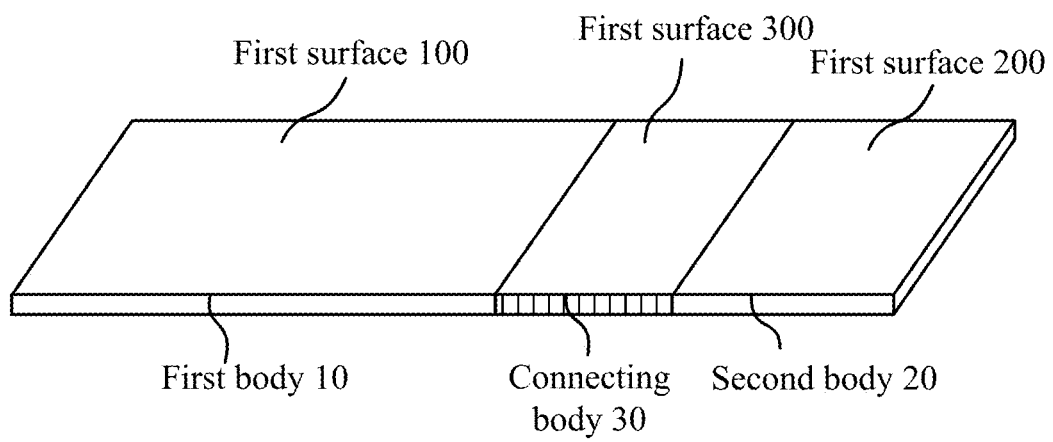
FIG. 25 is a perspective view of the third mode of electronic device according to the fifth embodiment of the present disclosure.

FIG. 25 is a perspective view of the third mode of electronic device according to the fifth embodiment of the present disclosure. As shown in FIG. 25, when the electronic device 1 is in the third mode, the first surface 100 of the first body 10 and the first surface 300 of the connecting body 30, and the first surface 200 of the second body 20 approximately form a single plane.

Figure 26:
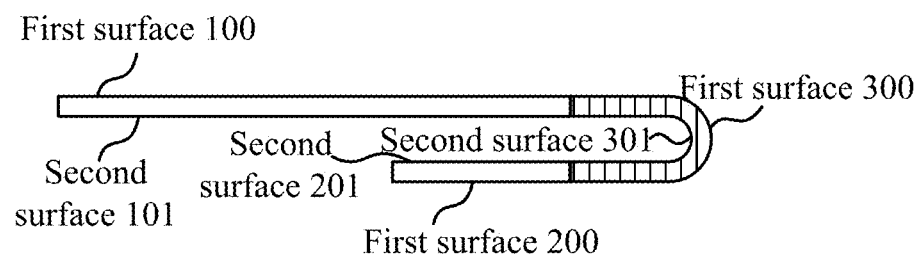
FIG. 26 is a perspective view of a fourth mode of electronic device according to the fifth embodiment of the present disclosure.

FIG. 26 is a perspective view of the fourth mode of electronic device according to the fifth embodiment of the present disclosure. As shown in FIG. 26, in the fourth mode, the first surface 100 of the first body 10 and the first surface 200 of the second body 20 are opposite. Specifically, the fourth mode may be that the second surface 201 of the second body 20 and the second surface 101 of the first body 10 contact, and may be also that a distance between the second surface 201 of the second body 20 and the second surface 101 of the first body 10 is less than a predetermined threshold.

Figure 27:
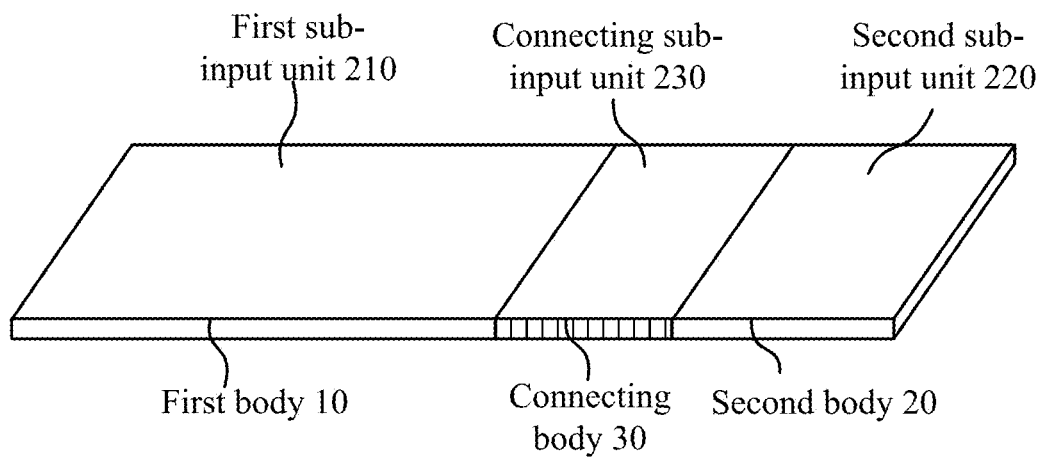
FIG. 27 is a perspective view of sub-input units of respective bodies of the electronic device according to the fifth embodiment of the present disclosure.

Hereinafter, respective input units of the electronic device according to the fifth embodiment of the present disclosure will be described in detail with reference to the accompanying drawings. FIG. 27 is a perspective view of sub-input units of respective bodies of the electronic device according to the fifth embodiment of the present disclosure. As shown in FIG. 27, the connecting body 30 comprises a connecting sub-input unit 230 configured to acquire a user input operation. For example, the second body 20 and the first body 10 may also have a first sub-input unit 210 and a second sub-input unit 220, respectively. In this way, the processor (not shown) of the electronic device 1 may perform a corresponding processing according to an input operation acquired by the respective sub-input units. For example, these sub-input units are a touch sensor, but they may be also a physical key or any other form of input units, as long as they can acquire the user's input operation. Typically, the first sub-input unit 210, the second sub-input unit 220, and the connecting sub-input unit 230 may be disposed on the same outer surface of the electronic device 1. FIG. 27 shows an example that the respective sub-input units are disposed on the first outer surface of the electronic device, that is, the first sub-input unit 210 is disposed on the first surface 100 of the first body 10, the second sub-input unit 220 is disposed on the first surface 200 of the second body 20, and the connecting sub-input unit 230 is disposed on the first surface 300 of the connecting body 30. However, the present disclosure is not limited to the case described above, at least one sub-input unit may be also disposed on the second surfaces of corresponding bodies, for example, the connecting sub-input unit 230 is disposed on the second surface of the connecting body 30. In addition, at least one sub-input unit may be also disposed on the first and second surfaces of corresponding bodies, for example, the second sub-input unit 220 is disposed on the first surface 201 and the second surface 202 of the second body.

Figure 28:
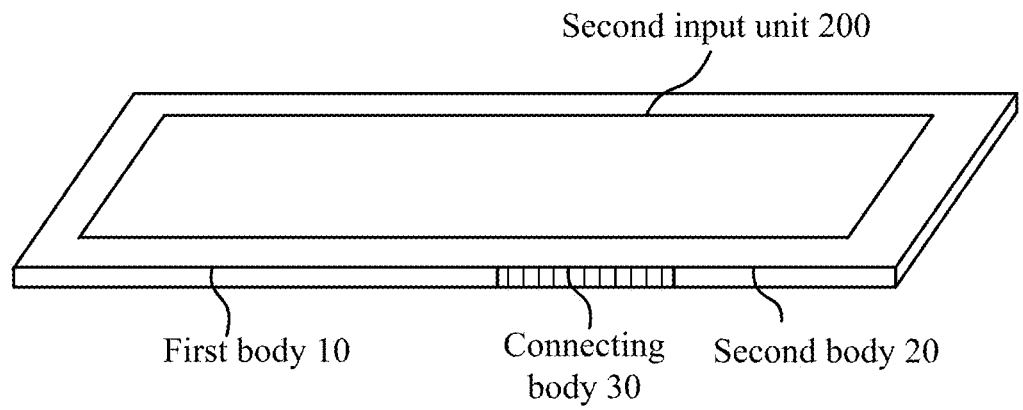
FIG. 28 is a perspective view of a second input unit of the electronic device according to the fifth embodiment of the present disclosure.

Next, the embodiments of the electronic device will be described in detail with reference to the accompanying drawings. FIG. 28 is a perspective view of a second input unit of the electronic device according to the fifth embodiment of the present disclosure. As shown in FIG. 28, the electronic device 1 may also have a second input unit 200 on the first outer surface, for acquiring an input operation on the whole first outer surface. In this case, the first sub-input unit 210, the connecting sub-input unit 230, and the second input unit 220 compose the first region, the second region, and the third region on the second input unit, respectively. By the above-described structure, it is possible to acquire an input from a user integrally on the first outer surface, so that the user can input instructions in a larger space, achieve stronger functions.

Figure 29:
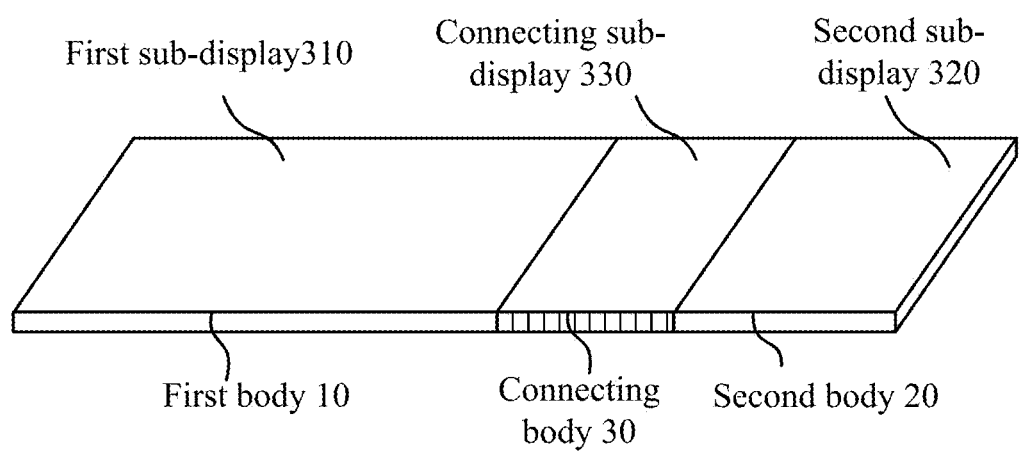
FIG. 29 is a perspective view of sub-displays of respective bodies of the electronic device according to the fifth embodiment of the present disclosure.

In addition to the function of acquiring user input, the electronic device 1 according to this embodiment of the present disclosure may also simultaneously have a display function. FIG. 29 is a perspective view of sub-displays of respective bodies of the electronic device according to the fifth embodiment of the present disclosure. As shown in FIG. 29, the first surface 100 of the first body 10 may comprise the first sub-display 310, the first surface 300 of the connecting body 30 may comprise the connecting sub-display 330, the first surface 201 of the second body 20 may comprise the second sub-display 320. In this way, respective sub-displays can display contents associated with processings executed by the processor of the electronic device 1. However, the present disclosure is not limited to the case described above, at least one sub-display may be also disposed on the second surfaces of corresponding bodies, for example, the second sub-display 320 is disposed on the first surface 201 and the second surface 202 of the second body. In addition, at least one sub-input unit may be also disposed on the first and second surfaces of corresponding bodies, for example, the second sub-display 320 is disposed on the first surface 201 and the second surface 202 of the second body, respectively. On the other hand, the electronic device 1 according to the fifth embodiment of the present disclosure may also comprise one or two among the first sub-display, the connecting sub-display, and the second sub-display. For example, the electronic device 1 according to the fifth embodiment of the present disclosure may have no second sub-display disposed on the first surface of the second body.

In an embodiment, the first sub-display 310, the second sub-display 320, and the connecting sub-display 330 may be made overlap with at least a part of the first sub-input unit 210, the second sub-input unit 220, and the connecting input unit 230, respectively, to achieve a touch screen function of the first body 10, the second body 20 and the connecting body 30.

Figure 30:
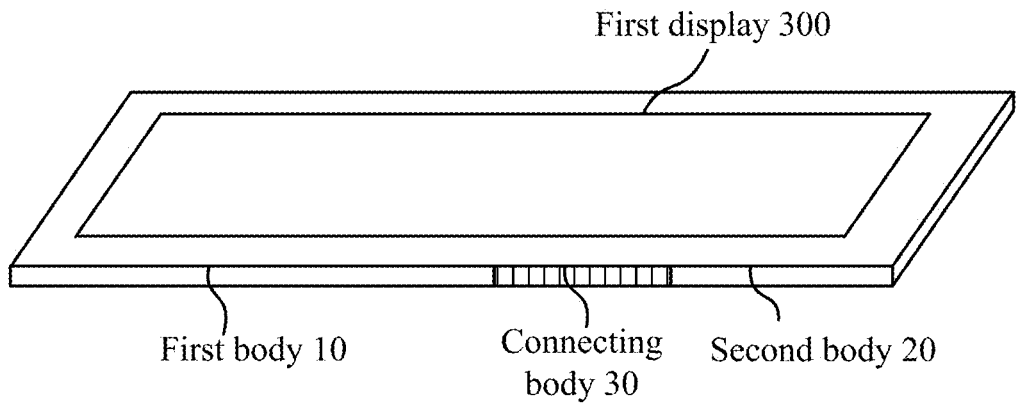
FIG. 30 is a perspective view of a first display of the electronic device according to the fifth embodiment of the present disclosure.

For example, it is possible to set a deformable display on the first outer surface of the electronic device. FIG. 30 is a perspective view of a first display of the electronic device according to the fifth embodiment of the present disclosure. As shown FIG. 30, the first sub-display 310, the connecting sub-display 330, and the second sub-display 320 form the first region, the second region, and the third region of the first display 300, respectively. It should be noted that, the present disclosure is not limited thereto, the first display 300 may cover only one or two among the respective sub-displays, for example, the first sub-display 310 and the connecting sub-display 330 serve as the first region and the second region of the first display 300, and the second sub-display 320 is independent of the first display 300. In this case, the first display 300 may have a deformation along with the connecting body 30, thereby it can adapt to various modes of the electronic device 1. By means of disposing the first display on the first outer surface, associated content can be displayed in a large area in the first outer surface of the electronic device 1, such as playing a video etc. In addition, the first display 300 may overlap with at least a part of the second input unit 200, this can achieve the touch screen function entirely on the first outer surface of the electronic device 1.

The electronic device 1 may store in a storage unit (not shown) various instruction sets, and instructions in each instruction set indicate a mapping relationship between a user input and a corresponding processing executed by the processor (not shown). In an embodiment of the present disclosure, the processor can respond to an input operation acquired respectively by the first sub-input unit 210, the second sub-input unit 220, and the connecting sub-input unit 230 (or acquired by the second input unit 220 entirely), according to a different mode of the electronic device 1 and depending on instructions in a different instruction set. Illustration will be provided below with the third mode and the fourth mode as example.

Figure 31:
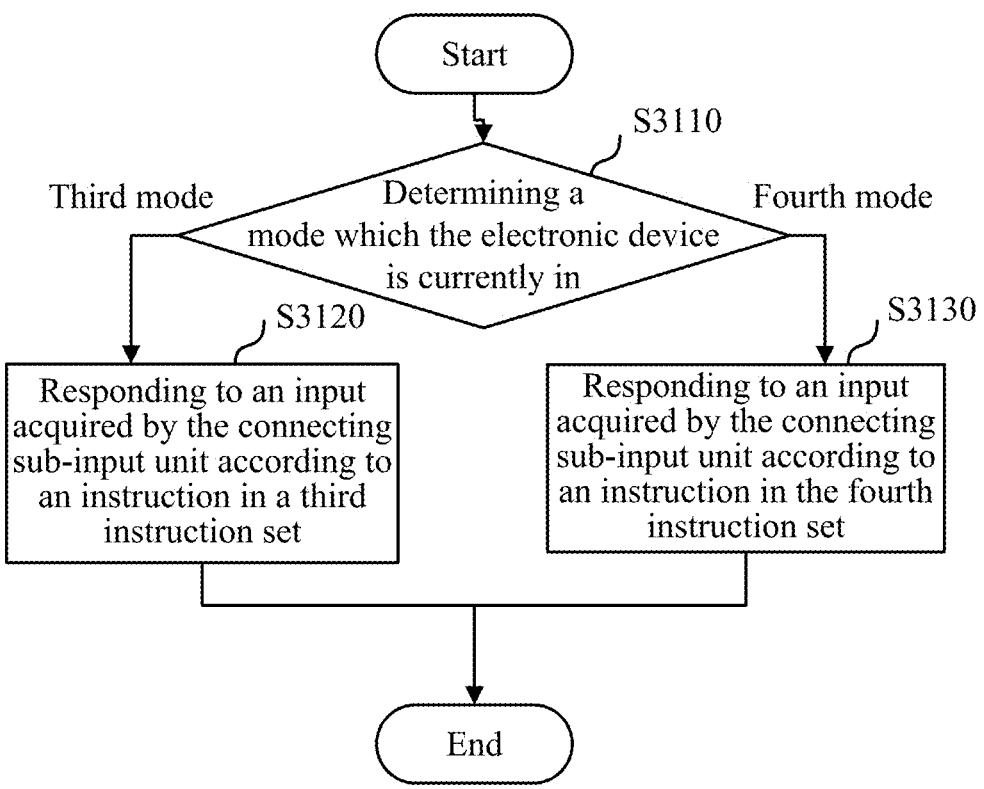
FIG. 31 is a flowchart of a control method of the electronic device according to the fifth embodiment of the present disclosure.

Hereinafter, actions of the processor of the electronic device 1 will be described in detail with reference to the accompanying drawings, these steps will constitute a control method for the electronic device in the present disclosure. It should be noted that, illustration will be provided below with the third mode and the fourth mode of the electronic device 1 as example, but in fact, it is not limited thereto, the present disclosure may be applied to other modes of the electronic device 1. FIG. 31 is a flowchart of a control method of the electronic device according to the fifth embodiment of the present disclosure, as shown in FIG. 31:

First, a mode which the electronic device 1 is currently in is determined (step S3110). As described above, since the connecting body 30 is deformable, so the second body 20 is at least capable of rotating relative to the first body based on the connecting body, thus the electronic device 1 can switch between different modes. Accordingly, it is possible to set a sensor on the connecting body 30 of the electronic device 1, and a mode which the electronic device 1 is currently in may be determined according to a deformation state of the connecting body 30.

When the electronic device is in the third mode, an input acquired by the connecting sub-input unit is responded according to an instruction in a third instruction set (step S3120). In this case, the electronic device 1 presents the user with an entire first outer surface, thus the third instruction set can make the connecting sub-input unit, the first sub-input unit, and the second sub-input unit as an input in common (or making the second input unit as an input) to perform corresponding processing. In this way, an input from the user can be acquired on the entire first outer surface, thus achieving various functions that require a wide range.

When the electronic device is in the fourth mode, an input acquired by the connecting sub-input unit is responded according to an instruction in the fourth instruction set (step S3130). The fourth instruction set may be instructions that make the connecting sub-input unit 230 to acquire independently from the first sub-input unit 210 and the second sub-input unit 220. As an example, display of the first sub-display 310 and/or the second sub-display 329 may be controlled in response to an input acquired by the connecting sub-input unit 230. For example, during a video playback function of the electronic device 1, it is possible to slide the connecting sub-input unit 230 to adjust the volume; during an image display function, it is possible to slide the connecting sub-input unit 230 to zoom in or zoom out a picture;

during an electronic book reading function, it is possible to slide the connecting sub-input unit 230 to control page turning, etc.

Figure 32:
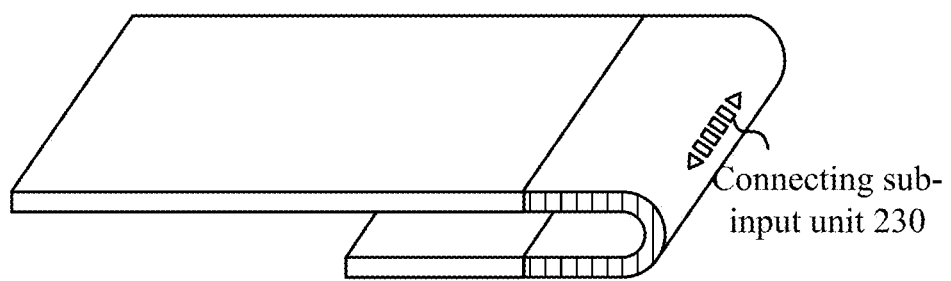
FIG. 32 is a perspective view of a connecting sub-input unit of the electronic device according to the fifth embodiment of the present disclosure.

FIG. 32 is a perspective view of a connecting sub-input unit of the electronic device according to the fifth embodiment of the present disclosure. As shown in FIG. 32, when the electronic device 1 is in the fourth mode, the connecting part is bent so that a first surface facing the user will form a thin strip region along the direction of rotary shaft. In this case, the connecting input unit 230 for example comprises a touch sensor, and the processor of the electronic device determines an input of the touch sensor, when a determination result indicates that the input is a slide input along the direction of the rotary shaft, various processings described above are to be executed. In this way, it is possible to identify a slide input along the direction of the rotary shaft, thus avoiding an error operation.

From above, the electronic device and the mode switching method according to the present disclosure can implement at least two different operating modes, so as to provide different display regions in different operating modes, and based on the operating modes, execute display of the corresponding content in the different display regions.

It should be noted that, in the specification, the terms "comprise", "comprise" and any other variations thereof intend to cover nonexclusive inclusion so that the procedure, the method, the product or the equipment comprising a series of elements comprise not only these elements, but also other elements which are not listed explicitly, or also comprise inherent elements of these procedure, method, product or equipment. In the case that there is no further limitation, elements defined by the expressions "comprise one . . . " do not exclude there being additional identity elements in the procedure, method, product or equipment of the elements.

Finally, it should be noted that, the above-described series of processings do not only comprise processings executed chronologically in the order mentioned here, and also comprise processings executed in parallel or individually but not chronologically.

Through the above description of the implementations, a person skilled in the art can clearly understand that the present disclosure may be implemented in a manner of software plus a necessary hardware platform, and of course the present disclosure may also be implemented fully by hardware. Based on such understanding, the technical solution of the present disclosure that contributes to the background art may be embodied in whole or in part in the form of a software product. The computer software product may be stored in a storage medium, such as ROM/RAM, disk, CD-ROM, and comprise several instructions for causing a computer apparatus (which may be a personal computer, a server, or a network device) to perform the method described in the various embodiments of the present disclosure or certain parts thereof.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for a person with ordinary skill in the art, depending on the concepts of the present disclosure, modifications may be made to the specific implementations and applications. To sum up, contents of this specification should not be construed as limiting the present disclosure.

The invention claimed is:
1. An electronic device, comprising:
a first body having a first end and a second end, the first end being a free end;
a connecting body having a third end and a fourth end, the third end being connected to the second end;
a second body having a fifth end and a sixth end, the fifth end being connected to the fourth end, the six end being a free end, the second body being capable of moving relative to the first body based on the connecting body;
wherein the electronic device has at least a first rotation manner and a second rotation manner, such that,
in the first rotation manner, the electronic device is capable of implementing a relative rotation between a first part and a second part with a rotation axis being at a first position of the connecting body, the first part comprises the first body and a first connecting sub-body, the second part comprises the second body and a second connecting sub-body, the first connecting sub-body and the second connecting sub-body are formed by dividing the connecting body at the first position; and
in the second rotation manner, the electronic device is capable of implementing a relative rotation between a third part and a fourth part with a rotation axis being at a second position of the connecting body, the third part comprises the first body and a third connecting sub-body, the fourth part comprises the second body and a fourth connecting sub-body, the third connecting sub-body and the fourth connecting sub-body are formed by dividing the connecting body at the second position, wherein
the electronic device has a first mode and a second mode, such that in the first mode, the electronic device rotates in the first rotation manner, and a maximum distance between corresponding points of the first body and the second body is less than a first predetermined threshold; and in the second mode, the electronic device rotates in the second rotation manner, and a maximum distance between corresponding points of the first body and the second body is less than a first predetermined threshold and wherein the electronic device executes a mode switching in a manner that the second body slides relative to the first body,
wherein the electronic device further comprises:
a sensor disposed in the first body and/or the connecting body and/or the second body, and configured to detect a mode of the electronic device, wherein the sensor further comprises a bending detecting unit disposed in a connecting body and configured to determine a mode of the electronic device according to a state of the connecting body;
a processor disposed in the first body and/or the connecting body and/or the second body, and configured to control a mode switching of the electronic device according to a mode detected by the sensor, wherein the processor comprises a processor that switches display content on the display according to a mode switching of the electronic device; and
wherein when the sensor detects that the mode of the electronic device is changing by measuring a size of an exposed region of the display of the first body by the sensor, each time a magnitude of the size of the exposed region is measured to have changed related to a predetermined magnitude of size, the display of the first body is controlled to change its display content according to change in magnitude of the size of the exposed region of the display.

2. The electronic device of claim 1, wherein the electronic device has a third mode, in which a first surface of the first body, a first surface of the connecting body and a first surface of the second body compose a first outer surface, and the first outer surface is flat or approximately flat in the third mode.

3. The electronic device of claim 1, further comprising a display disposed at least on the first surface of the first body, wherein an area of a first non-covered part of the display in the first mode is different than an area of a second non-covered part of the display in the second mode.

4. The electronic device of claim 3, wherein the display is a deformable display, the display is disposed at least in a region formed by a first surface of the first body and a first surface of the connecting body; or the display is disposed in a region formed by the first surface of the first body, the first surface of the connecting body, and the first surface of the second body and in the first mode and the second mode, one part of the display covers another part of the display.

5. The electronic device of claim 1, wherein the sensor comprises a photosensitive unit that comprises a light detecting array disposed corresponding to a light emitting array of the display, and determine an exposed region of the display according to that an array region that satisfies a predetermined luminance threshold in a light detecting array is detected to determine a mode of the electronic device.

6. The electronic device as claimed in claim 1, wherein the connecting body comprises at least three rotary members, each of the at least three rotary members has a self-rotary shaft, respective self-rotary shafts of the at least three rotary members are parallel to each other, and when an external force applied on one rotary member is vertical to the self-rotary shaft thereof and a magnitude of a component in a direction tangential to an outer surface of the one rotary member satisfies a second predetermined value, the one rotary member is capable of rotating around the self-rotary shaft thereof.

7. The electronic device as claimed in claim 6, wherein when the one rotary member rotates, the other rotary members rotate accordingly; or when the one rotary member rotates, at least one of the other rotary members does not rotate.

8. The electronic device of claim 6, wherein the connecting body is composed by the at least three rotary members; or the connecting body comprises two rotary member groups and at least one non-rotary member between the two rotary member groups, each rotary member group comprises at least two rotary members.

9. The electronic device of claim 1, wherein switching between the first mode and the second mode is implemented in a manner that a distance between the sixth end and the first body is maintained smaller than the first predetermined threshold.

10. The electronic device of claim 9, wherein when switching between the first mode and the second mode, a distance between a first surface of the first body and a first surface of the second body is smaller than the first predetermined threshold.

11. The electronic device of claim 10, wherein in the first mode, when the second body is acted upon an external force with a component in a direction from the sixth end to the fifth end and a magnitude of the component of the external force satisfies a first predetermined value, the electronic device switches from the first mode to the second mode; in the second mode, when the second body is subjected to an external force with a component in a direction from the fifth end to the sixth end and a magnitude of the component of the external force satisfies a first predetermined value, the electronic device switches from the second mode to the first mode.

12. The electronic device of claim 1, wherein a first surface of the first body and a first surface of the second body are parallel to each other both in in the first mode and the second mode, and the first surface of the first body and the first surface of the second body are kept parallel to each other in process of switching between the first mode and the second mode.

13. A mode switching method applied to an electronic device,
the mode switching method comprising:
detecting a mode of the electronic device; and
controlling a mode switching of the electronic device according to a detected mode;
wherein the electronic device comprises a first body having a first end and a second end; a connecting body having a third end and a fourth end, the third end being connected to the second end; a second body having a fifth end and a sixth end, the fifth end being connected to the fourth end, the second body being capable of moving relative to the first body based on the connecting body, wherein the electronic device has at least a first rotation manner and a second rotation manner such that in the first rotation manner, the electronic device is capable of implementing a relative rotation between a first part and a second part with a rotation axis being at a first position of the connecting body, the first part comprises the first body and a first connecting sub-body, the second part comprises the second body and a second connecting sub-body, the first connecting sub-body and the second connecting sub-body are formed by dividing the connecting body at the first position; and in the second rotation manner, the electronic device is capable of implementing a relative rotation between a third part and a fourth part with a rotation axis being at a second position of the connecting body, the third part comprises the first body and a third connecting sub-body, the fourth part comprises the second body and a fourth connecting sub-body, the third connecting sub-body and the fourth connecting sub-body are formed by dividing the connecting body at the second position, wherein
the electronic device has a first mode and a second mode, such that in the first mode, the electronic device rotates in the first rotation manner, and a maximum distance between corresponding points of the first body and the second body is less than a first predetermined threshold; and in the second mode, the electronic device rotates in the second rotation manner, and a maximum distance between corresponding points of the first body and the second body is less than a first predetermined threshold and wherein the electronic device executes a mode switching in a manner that the second body slides relative to the first body,
wherein the electronic device further comprises:
a sensor disposed in the first body and/or the connecting body and/or the second body, and configured to detect a mode of the electronic device, wherein the sensor further comprises a bending detecting unit disposed in a connecting body and configured to determine a mode of the electronic device according to a state of the connecting body; and
a processor disposed in the first body and/or the connecting body and/or the second body, and configured to control a mode switching of the electronic device according to a mode detected by the sensor;

the method further comprising switching display content on a display of the electronic device according to a mode switching of the electronic device; and wherein the switching display content on a display of the electronic device according to a mode switching of the electronic device further comprises:

when it is detected that the mode of the electronic device is changing by measuring a size of an exposed region of the display of the first body by the sensor, each time a magnitude of the size of the exposed region is measured of the exposed region of the display of the first body has changed related to a predetermined magnitude of size, the display of the first body is controlled to change its display content according to change in magnitude of the size of the exposed region of the display.

14. The mode switching method of claim 13, wherein a first surface of the first body and a first surface of the second body are parallel to each other both in in the first mode and the second mode, and the first surface of the first body and the first surface of the second body are kept parallel to to each other in process of switching between the first mode and the second mode.

\* \* \* \* \*